(12) United States Patent
Rothenberg

(10) Patent No.: US 8,958,145 B2
(45) Date of Patent: Feb. 17, 2015

(54) FIBER AMPLIFIER SYSTEM INCLUDING TAPERED FIBER BUNDLE AND COMBINED LENS AND SAMPLING GRATING

(71) Applicant: Northrop Grumman Systems Corporation, Falls Church, VA (US)

(72) Inventor: Joshua Elliott Rothenberg, Los Angeles, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 120 days.

(21) Appl. No.: 13/757,515

(22) Filed: Feb. 1, 2013

(65) Prior Publication Data

US 2013/0148193 A1    Jun. 13, 2013

Related U.S. Application Data

(62) Division of application No. 12/537,871, filed on Aug. 7, 2009, now Pat. No. 8,514,485.

(51) Int. Cl.
| | |
|---|---|
| *H04B 10/17* | (2006.01) |
| *H01S 3/10* | (2006.01) |
| *G02B 6/02* | (2006.01) |
| *G02B 6/04* | (2006.01) |
| *H01S 3/067* | (2006.01) |
| *H01S 3/23* | (2006.01) |
| *G02B 6/32* | (2006.01) |
| *H01S 3/00* | (2006.01) |
| *H01S 3/13* | (2006.01) |

(52) U.S. Cl.
CPC ........ *H01S 3/10061* (2013.01); *G02B 6/02042* (2013.01); *G02B 6/04* (2013.01); *H01S 3/06754* (2013.01); *H01S 3/2383* (2013.01); *G02B 6/32* (2013.01); *H01S 3/005* (2013.01); *H01S 3/06729* (2013.01); *H01S 3/06737* (2013.01); *H01S 3/06745* (2013.01); *H01S 3/1307* (2013.01); *H01S 3/2391* (2013.01)
USPC ........................................ 359/341.1; 359/349

(58) Field of Classification Search
USPC ........... 359/341.1, 341.4; 372/29.016, 29.023
See application file for complete search history.

(56) References Cited

U.S. PATENT DOCUMENTS

| | | | | |
|---|---|---|---|---|
| 6,016,376 | A * | 1/2000 | Ghaemi et al. | 385/116 |
| 6,542,675 | B1 * | 4/2003 | Tourgee et al. | 385/115 |
| 6,990,278 | B2 * | 1/2006 | Vakili et al. | 385/46 |
| 7,130,113 | B2 * | 10/2006 | Shakir et al. | 359/349 |
| 7,339,727 | B1 * | 3/2008 | Rothenberg et al. | 359/349 |
| 7,532,792 | B2 * | 5/2009 | Skovgaard et al. | 385/39 |
| 7,609,921 | B2 | 10/2009 | Shimotsu | |
| 7,782,527 | B1 * | 8/2010 | Brooks et al. | 359/341.1 |
| 8,514,485 | B2 * | 8/2013 | Rothenberg | 359/341.1 |
| 2005/0031266 | A1 * | 2/2005 | Vakili et al. | 385/43 |
| 2009/0154881 | A1 | 6/2009 | Salokatve | |
| 2009/0296751 | A1 * | 12/2009 | Kewitsch et al. | 372/18 |

FOREIGN PATENT DOCUMENTS

| | | |
|---|---|---|
| JP | H07-27950 A | 1/1995 |
| JP | 2008-103631 A | 5/2008 |

\* cited by examiner

*Primary Examiner* — Eric Bolda
(74) *Attorney, Agent, or Firm* — John A. Miller; Miller IP Group, PLC

(57) ABSTRACT

A fiber laser amplifier system including a beam splitter that splits a feedback beam into a plurality of fiber beams where a separate fiber beam is sent to a fiber amplifier for amplifying the fiber beam. A tapered fiber bundle couples the output ends of all of the fiber amplifiers into a combined fiber providing a combined output beam. A beam sampler samples a portion of the output beam from the tapered fiber bundle and provides a sample beam. A single mode fiber receives the sample beam from the beam sampler and provides the feedback beam.

19 Claims, 14 Drawing Sheets

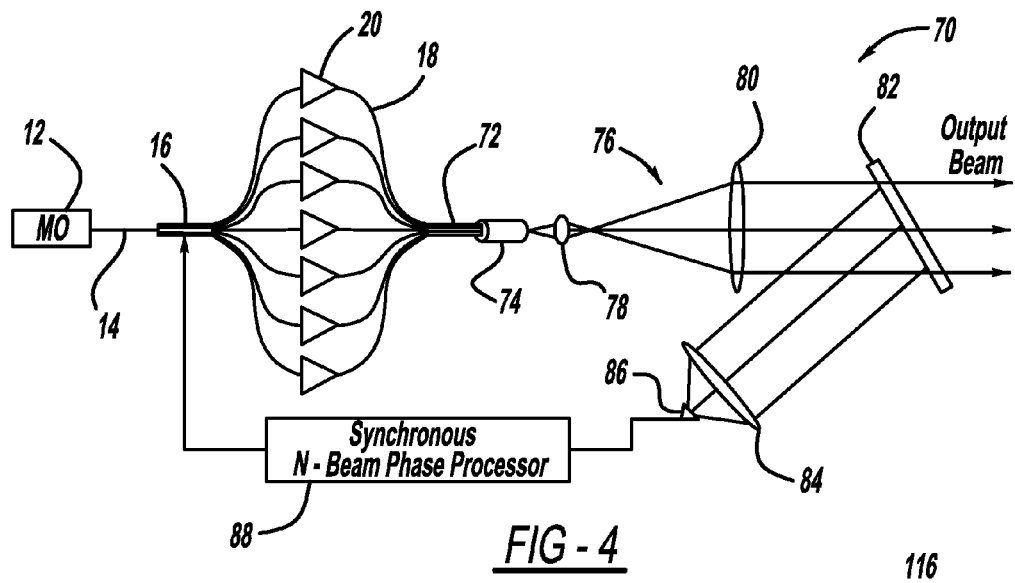
FIG - 4
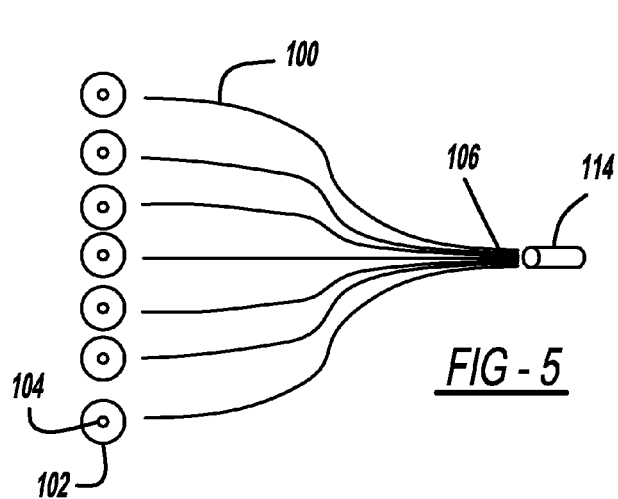
FIG - 5
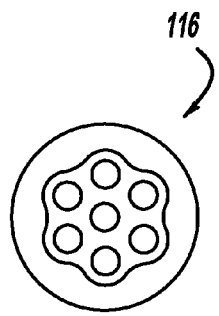
FIG - 8
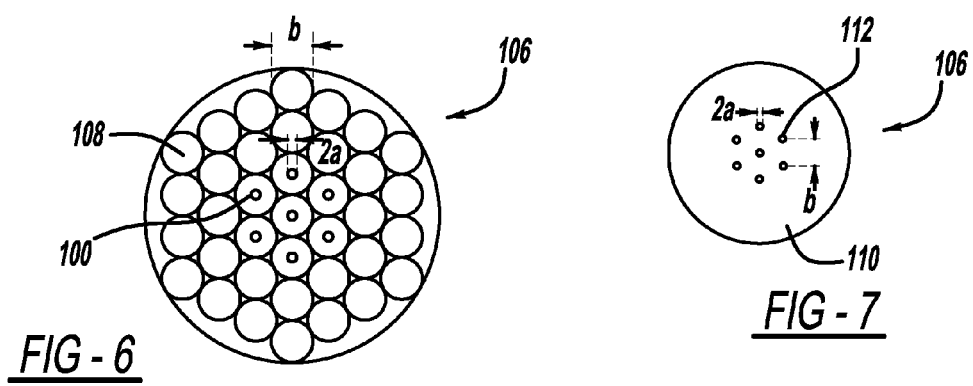
FIG - 6
FIG - 7

FIBER AMPLIFIER SYSTEM INCLUDING TAPERED FIBER BUNDLE AND COMBINED LENS AND SAMPLING GRATING

CROSS-REFERENCE TO RELATED APPLICATIONS

This application is a divisional application of U.S. patent application Ser. No. 12/537,871 filed Aug. 7, 2009, titled "Passive All-Fiber Integrated High Power Coherent Beam Combination."

BACKGROUND

1. Field of the Disclosure

This disclosure relates generally to a high power fiber laser amplifier and, more particularly, to a high power fiber laser amplifier that couples ends of the fiber amplifiers into a tapered fiber bundle to combine the beams with improved fill factor.

2. Discussion of the Related Art

High power laser amplifiers have many applications, including industrial, commercial, military, etc. Designers of laser amplifiers are continuously investigating ways to increase the power of the laser amplifier for these applications. One known type of laser amplifier is a fiber laser amplifier that employs doped fibers and pump beams to generate the laser beam. Typically, a high power fiber laser amplifier uses a fiber that has an active core diameter of about 10-20 μm or larger. Modern fiber laser amplifier designs have achieved single fiber power levels up to 5 kW. Some fiber laser systems employ multiple fiber laser amplifiers and combine them in some fashion to higher powers.

A design challenge for fiber laser amplifiers is to combine the beams from each fiber in a coherent manner so that the beams provide a single beam output having a uniform phase over the beam diameter such that the beam can be focused to a small focal spot. Focusing the combined beam to a small spot at a long distance (far-field) defines the beam quality of the beam, where the more coherent the individual fiber beams the more uniform the combined phase and better the beam quality. Improvements in fiber laser amplifier designs increase the output power and coherency of the fiber beams in such a way as to approach the theoretical power and beam quality limit of the laser system.

BRIEF DESCRIPTION OF THE DRAWINGS

FIG. 4 is a schematic plan view of a fiber laser amplifier including a tapered fiber bundle and a beam phase detector;

FIG. 5 is a diagram of a tapered fiber bundle and an end cap;

FIG. 6 is a cross-sectional view of an input end of the tapered fiber bundle shown in FIG. 5;

FIG. 7 is a cross-sectional view of an output end of the tapered fiber bundle shown in FIG. 5;

FIG. 8 is a profile of the near-field beam intensity of an output beam from the tapered fiber bundle shown in FIG. 5;

DETAILED DESCRIPTION OF THE EMBODIMENTS

The following discussion of the embodiments of the disclosure directed to fiber laser amplifiers including tapered fiber bundles is merely exemplary in nature, and is in no way intended to limit the invention or its applications or uses.

Figure 1:
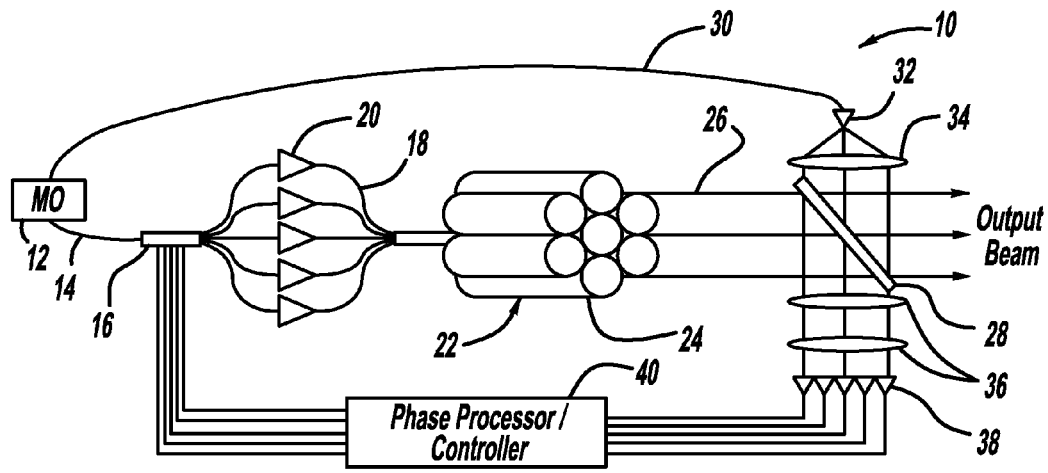
FIG. 1 is a schematic plan view of a known fiber laser amplifier including a fiber lens array.

FIG. 1 is a schematic plan view of a known fiber laser amplifier system 10 including a master oscillator (MO) 12 that generates a signal beam on optical fiber 14. A fiber laser amplifier system of the type shown in FIG. 1 can be found in U.S. Pat. No. 6,708,003 issued Mar. 16, 2004 to Wickham et al., titled Optical Energy Transmission System Utilizing Precise Phase and Amplitude Control, assigned to the assignee of this application and herein incorporated by reference. The signal beam is spilt into a certain number of split beams by a splitter and phase modulators 16, where a separate phase modulator 16 is provided for each split beam. The splitter and the phase modulator are actually two separate devices, but shown here is a single object because they can be implemented on a single chip. The phase modulators 16 adjust the phase of each split beam so that all of the beams are in phase with each other in a coupled output beam 26, as will be discussed in further detail below. The split beams from the phase modulators 16 are then sent to fiber amplifiers 18 where amplifiers 20 represent the doped amplifying portion of the fiber amplifiers 18 that receive an optical pump beam (not shown). The amplified fiber beams from the fiber amplifiers 18 are then sent to a fiber lens array 22 including a cylindrical fiber lens 24 for each fiber amplifier 18, where each of the lenses 24 are coupled together as the array 22 so that all of the fiber beams are be coupled together as the coupled output beam 26. The fiber lens array 22 collimates and precisely co-aligns each of the fiber beams to form a tiled array of collimated beams. The coupled output beam 26 is sent to a beam sampler 28 that splits the beam 26, where the majority of the beam intensity is provided as the output beam of the system 10.

The MO 12 also provides a reference beam on a fiber 30 that is amplified by a fiber amplifier 32 and collimated by a lens 34. The collimated reference beam from the lens 34 is sent to the beam sampler 28 where the reference beam interferes with each of the fiber beams in the coupled beam 26 to provide an interference pattern between the reference beam and each separate fiber beam. The interfered beams are directed by lenses 36 to an array of phase detectors 38, where a separate phase detector 38 is provided for each separate fiber beam. An electrical signal defining the interference pattern between the beams from the detectors 38 is sent to a phase processor and controller 40 that provides phase correction signals to each of the phase modulators 16 to adjust the phase of the split beams from the MO 12 so that they are all in phase with each other and the output beam 26 is one coherent beam that can be tightly focused in the far-field.

Figure 2:
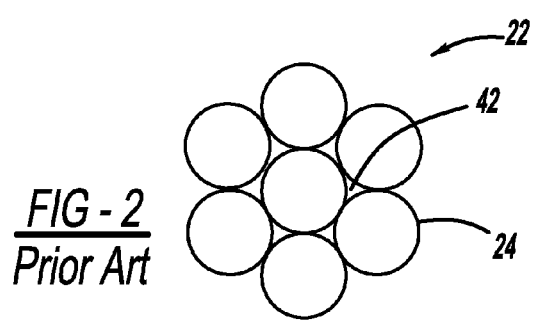
FIG. 2 is a cross-sectional view of the fiber lens array used in the fiber amplifier shown in FIG. 1.

FIG. 2 is a cross-sectional view of the lens array 22 including the individual lenses 24. As is apparent from this configuration, the cylindrical shape of the lenses 24 creates a dead space 42 between the lenses 24, which results in a reduced fill factor, defined as the fraction of the combined beam area occupied by the high power beams. As used herein, improved fill factor means a larger fill factor and better beam quality or focusability to a smaller diffraction limited spot. By making the beams in phase with each other and contiguous, the beam quality of the output beam 26 is improved and it can be focused to a small spot. Therefore, it is desirable to make the lenses 24 as tightly packed together as possible. Further, the actual beam propagating through the core in each of the fibers are Gaussian beams that have a bell shape beam profile with a higher center intensity, and reduced peripheral intensity. When a close packed array of Gaussian beams is focused, the central focal lobe will typically include only about 60% of the combined beam power as a result of the Gaussian shape and intervening dead space between beams. Thus, the reduced fill factor of the combined beam array results from a combination of both the Gaussian shape of the individual beams and the intervening dead space 42, where the combined output power being focused in the central far-field focal lobe is given by the fill factor, which is about 60% of the total beam power.

Figure 3:
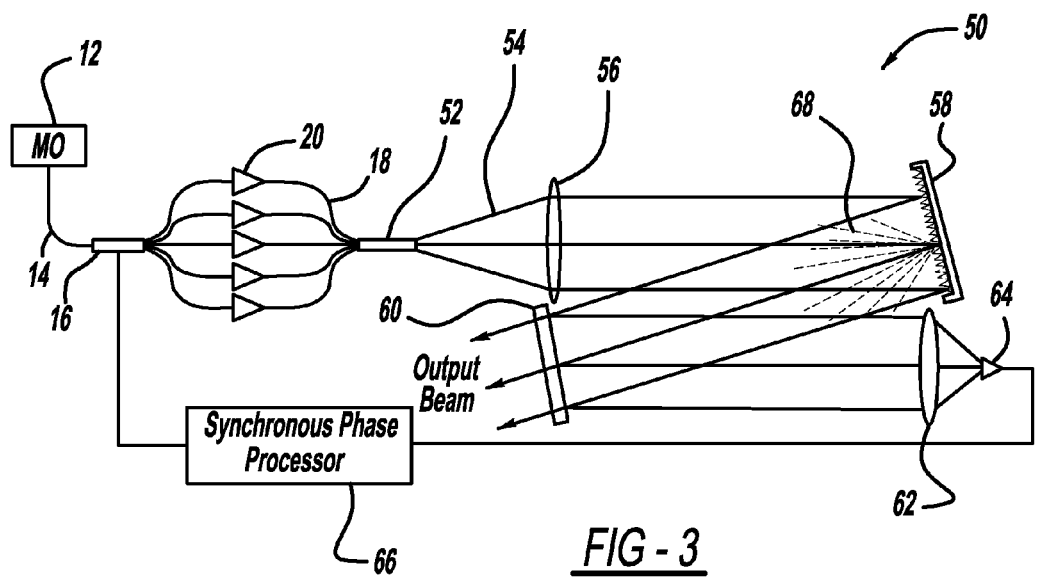
FIG. 3 is a schematic plan view of a known fiber laser amplifier including a DOE combiner.

FIG. 3 is a schematic plan view of a known fiber laser amplifier system 50 that eliminates the fill factor discussed above, where like elements to the system 10 are identified by the same reference numeral. A fiber amplifier of this type can be found in U.S. Pat. No. 7,440,174 issued Oct. 21, 2008 to Rice et al., titled Coherent Fiber Diffractive Optical Element Beam Combiner, assigned to the assignee of the present application and herein incorporated by reference. In this embodiment, the fiber amplifiers 18 are spliced into a single fiber array 52 to generate an array of closely spaced output beams 54. The output beams 54 are collimated by optic 56 and then sent to a diffractive optical element (DOE) 58 that combines the beams when they are precisely aligned and phased. The diffracted beams from the DOE 58 provided at the same angle are directed to a beam sampler 60 that splits the beams where a majority portion of the combined beam is the output beam from the system 50.

A split portion of the combined beam from the DOE 58 is collected by focusing optics 52 and sent to a phase detector 64. The phase detector 64 measures the phase of the combined beam and sends a measurement signal to a synchronous phase processor 66. By detecting the phase of the combined beams in this manner, the reference beam can be eliminated and a single phase detector can be employed. The phase of the constituent beams can be distinguished in the single output phase detector 64 by uniquely dithering or coding the constituent fiber beams in phase or amplitude, such as by using distinct frequencies for frequency modulation (FM) or amplitude modulation (AM), distinct codes for code division multiple access (CDMA) or time division multiple access (TDMA), etc., so that a synchronous detector scheme can distinguish the constituent phase signals for each fiber beam in the combined beam. Such a technique is disclosed in U.S. Pat. No. 7,346,085 issued Mar. 18, 2008 to Rothenberg et al., titled Multi-Stage Method and System for Coherent Diffractive Beam Combining, assigned to the assignee of this application and herein incorporated by a reference. The synchronous phase processor 66 decodes the distinct constituent phases in the measurement signal form the phase detector 64, and generates phase error correction signals for each fiber beam that are sent to the corresponding phase modulators 16 so that adjustments to the phase of the individual fiber beams in the fiber amplifiers 18 causes all of the constituent fiber beams in the output beam to be locked in phase. Because the array of fiber beams 52 is combined into a single output beam, the fill factor problem is eliminated, and the output beam can be focused to a nearly diffraction limited spot to reach nearly the theoretical limit of brightness provided by the total combined power of the beams.

Diffracted beams 68 from the DOE 58 other than the combined output beam have limited angular separation, and thus require a fairly large path length to sufficiently separate the diffracted output beams, thus making the system 50 less compact. Further, the array of output fibers must be aligned to very high precision with each other and to the output optics of the system 50 in order to achieve high beam combination efficiency. Such precision alignment is even more challenging in the presence of unavoidable thermal dissipation that accompanies the presence of multi-kW laser beams. Thus, it would be desirable to provide a fiber amplifier system having excellent beam quality, but avoids the need for fiber arrays to be precisely aligned to bulky free space optical elements. In addition, an approach that combines the beams in an all-fiber format can provide an ideal packaging solution for power scaling at high power within a single fiber aperture, which can then be either directly injected into a telescope or used as a building block for further beam combinations.

FIG. 4 is a schematic plan view of a fiber laser amplifier system 70 that provides improvements over the systems 10 and 50 discussed above by providing beam combining with higher fill factor and beam quality in the fiber material itself. In the system 70, like elements to the systems 10 and 50 are identified by the same reference number. In this embodiment, ends of the fiber amplifiers 18 are joined to an input end of a tapered fiber bundle 72 that combines the fiber amplifiers 18 into a single fiber mass. An end cap 74 is then mounted to an output end of the tapered fiber bundle 72. The output beam from the end cap 74 is collected and focused by a telescope 76 including receiving optics 78 and collimating optics 80. The beam from the telescope 76 is sampled by a beam sampler 82 where the majority of the beam is directed out of the system 70 as an output beam. In the manner as discussed above, the sampled portion of the combined beam from the beam sampler 82 is focused by focusing optics 84 onto a phase detector 86 that measures the phase of the combined beam and sends an electrical signal of the phase measurement to a synchronous N-beam phase processor 88. The processor 88 then sends phase error correction signals to the phase modulators 16 to control the phase of the beams in the fiber amplifiers 18 so that all of the constituent fiber beams in the combined output beam are locked together with the same phase in the manner as discussed above. Similar to the method described in the laser system 50, in order to be able to determine the proper phase control signals for the individual beams that are split by the splitter 16, the phase modulators 16 apply a distinct dither frequency for FM or AM, or a distinct code for CDMA or TDMA, on each split beam that are in the combined beam at the output of the system 70. The phase detector 86 can detect the distinct dither frequencies or codes, and the processor 88 can use that information to determine a phase error for each split beam, and provide error correction signals to the corresponding phase modulators 16 for each of the respective split beams to properly phase lock all of the constituent beams in the combined output.

FIG. 5 is an illustration of seven fibers 100, each having an outer cladding layer 102 and an inner core 104 through which the beam propagates, being coupled to a tapered fiber bundle 106 of the type referred to above. FIG. 6 shows a cross-sectional view of an input end of the tapered fiber bundle 106 with the seven fibers 100 at an inner portion of the bundle 106 and a plurality of cladding fibers 108 formed around the bundle of fibers 100. FIG. 7 is a cross-sectional view of an output end of the tapered fiber bundle 106 showing that the combination of the fibers 100 and the cladding fibers 108 has been formed into a single fiber mass 110 where points 112 represent the cores 104 of the fibers 100. FIG. 8 is a cross-sectional view of a beam profile 116 in the near-field of the beam that is output from the end cap 114.

The tapered fiber bundle 106 can be made by any of the well known technique for fabricating tapered fiber bundles where the fibers 100 and 108 are gathered in a bundle, and the bundle is then drawn down in diameter in a carefully controlled high temperature fusion process. The end result is a scaled down version of the initial closely packed bundle of fiber amplifiers where the final core diameter 2a and the spacing b determines the final output fill factor of the combined beam. Because these beams are of very high intensity it is necessary to splice an end cap 114 to the output end of the tapered fiber bundle 106 to avoid damage at the exit surface of the tapered fiber bundle 106. The combined beam expands by diffraction in the end cap 114 until the peak intensity is sufficiently reduced so that surface damage is avoided. A gradient index (GRIN) lens with a negative focal length can be incorporated into the end cap 114 to increase the divergence of the output beam, as will be discussed below.

Once the output beam exits the end cap 114 it is collimated and/or imaged by a simple lens or curved mirror to a desired beam size and collimation by the telescope 76. There is no need for a lens array or other precise fiber-to-fiber alignment. The external optics are simply collimation and/or telescope optics used to magnify the beam to a desired size, which are commonly used in many high power laser systems and beam directors. This is in contrast to the systems 10 and 50 which both require a very precise alignment of each of the individual fibers to external free-space optics. There is no such requirement in the system 70 beyond the usual alignment requirements of the entire single beam in the final telescope. In addition, there is no requirement on the exact spacing of the fiber cores within the tapered fiber bundle 72, other than to space them as close as possible, and the co-alignment of the cores is quite relaxed because the divergence of each individual fiber is 10's of mrad. Thus, this approach provides a combined output beam with N times the beam power out of a single fiber aperture and a minimum of free-space optics, where N is the number of fiber beams combined. The laser system 70 thereby provides a quantum leap in integration, compactness and ruggedness in comparison to the systems 10 and 50.

The tapered fiber bundle 106 maximizes the fill factor by bringing the fiber cores close together so that the individual fiber modes overlap. Once the modes overlap, there will be cross-coupling and interference between the fiber modes. By locking the phases of the fibers together, as discussed above, formation of an in-phase super-mode can be ensured, which exhibits constructive interference between all of the fibers and significantly enhances the intensity in the gaps between the beams. In this way, it can achieve a combined beam with a continuous intensity profile and little or no intervening dead space. The challenge is making the tapered fiber bundle to ensure there is negligible loss within the bundle. Thus, the input fibers to the tapered fiber bundle 106 must have a sufficiently large diameter cladding so that very little power appears at the cladding surface. Generally, this will require a cladding diameter b to be about 2-3 times the core diameter 2a, which, for the large mode area fibers of interest, limits the power at the cladding surface to 1 PPM of the total. Since the cores are separated by the cladding diameter b, this ratio will predominately determine the pre-tapered fill factor. The fill factor can be quite low for a ratio of b/2a=3, where only about 20% of the power is focused into the central lobe with 25 μm cores and NA=0.06, where NA is the numerical aperture. As the bundle is tapered down, both the core and cladding diameters will generally decrease in proportion as the fibers also fuse together so that this ratio of cladding-to-core diameter is approximately maintained through the taper, and hence, it would appear that the fill factor is unchanged. In addition, tapering down the core diameter would appear to reduce the mode diameter such that the peak intensity increases, which may be limiting for very high power amplifiers. However, the surprising result is that as the core diameter decreases during the taper, the mode shape changes such that the mode area reduction is limited to a minimum value and the tails of the mode field distribution broaden significantly. This behavior serves to both limit the peak intensity within the tapered fiber bundle 72 and ensures better overlap of the modes, and thus, rather that remaining constant through the taper, the fill factor can increase significantly.

Figure 9:
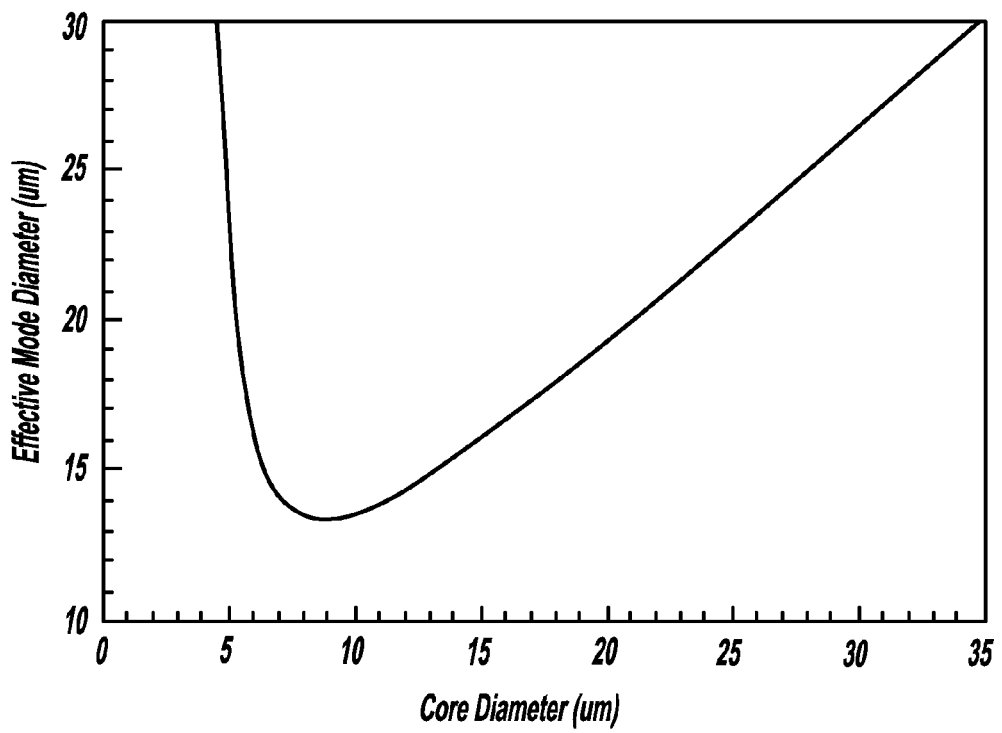
FIG. 9 is a graph with core diameter on the horizontal axis and effective mode diameter on the vertical axis showing the effective diameter of the mode of a step index fiber.

FIG. 9 is a graph with core diameter on the horizontal axis and effective mode diameter on the vertical axis that shows the effective diameter of the mode of a step index fiber with NA=0.06 as a function of the core diameter. The effective diameter in this plot is defined as a $1/e^2$ intensity diameter of a Gaussian that has the same peak intensity as the fiber mode. It can be seen that as the core diameter is decreased, the mode diameter reaches a minimum of approximately 13 μm, and then rapidly increases. It should be noted that the fiber is strictly single mode when the core diameter is less than about 14 μm (V#=NA×2πa/λ<2.4, for λ=1080 nm). This rapid increase of the mode diameter for smaller cores is the result of the increase in the tails of the mode. Starting with an initial core diameter of 25 μm, it can be shown that the mode is well confined within a negligible power beyond approximately 2.5 times the core diameter, but as the core diameter, and thus the V#, decreases, the reduced confinement of the mode tails increases the effective mode diameter, and thus increases the mode overlap in the tapered fiber bundle 72. With a further reduction in the core diameter, as the V# approaches approximately 1, the tails approach very limited confinement, and thus allow the arbitrarily large mode overlap, but also for increased losses out of the cladding layer. If the phases of the individual beams are locked to ensure in-phase (constructive) interference in the forming super-mode, then the fill factor penalty can be greatly reduced. By optimizing the core size at the output of the tapered fiber bundle 72 good overlap can be achieved, while still allowing excellent confinement within the now larger cladding of a reasonably sized bundle, such as 400 μm diameter.

It should be noted that the process can be improved beyond a simple tapering process in which the core size and spacing both decrease in proportion. The use of carefully tailored temperature in the tapering process can lead to enhanced diffusion of dopants around the core, and therefore the effective core size can be increased by diffusion relative to the proportionate change in the core-to-core spacing. This process effect can further enhance the tapered fiber bundle output mode fill factor.

As an example of a combined output beam obtained from the end cap 74, consider a hexagonally closely packed tapered fiber bundle that takes seven fibers with 25 μm/62.5 μm core/cladding diameters as an input, where the initial core-to-core spacing is also about 62.5 μm. The input is tapered down to about 3.6 times to a 6.9 μm core size, where the V# is ~1.2, and the core-to-core spacing is reduced to 17.2 μm. The input fiber modes have a negligible fraction (approximation signal 1 PPM) of the fiber power at the untapered cladding interface, but the modes have a large overlap with the neighboring cores once they are fused together and tapered down. Propagation simulations show that proper adiabatic tapering of the cores limits out-coupling from the lowest order mode in each core to 10's of PPM. All of the mode fields are assumed to have been phased so that they add coherently, and thus fully maximize the fill factor.

Figure 10:
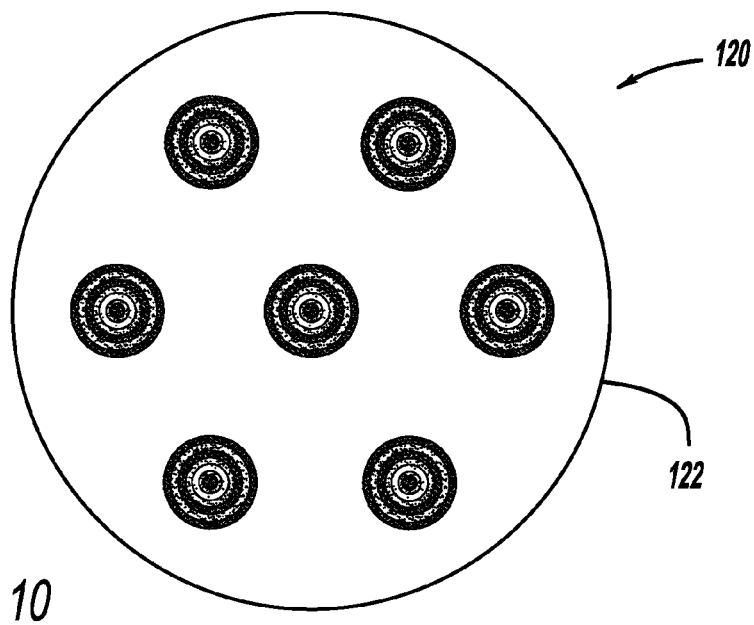
FIG. 10 is a profile of a near-field beam intensity distribution of a closely packed seven fiber bundle before being tapered.

A near-field intensity distribution 120 of a closely packed seven fiber bundle with 25 μm/62.5 μm core/cladding diameters before being tapered is shown in FIG. 10 where ring 122 is the assumed reference aperture diameter $D_{ref}$ of about 190 μm, which is used to define the far-field diffraction limited radius $\lambda/D_{ref}$. It can be shown that the LMA modes are well confined and do not overlap, and because of the large spacing between the input cores, the fill factor is quite low. It can be further shown that the calculated power in the bucket (PIB) of a combined beam based on this geometry is only about 17% within the diffraction limited far-view of angular radius $1.2\lambda/D_{ref}$. In comparison, a diffraction limited flat top beam that fully fills the reference aperture achieves about an 84% PIB in this diffraction limited angular bucket.

Figure 11:
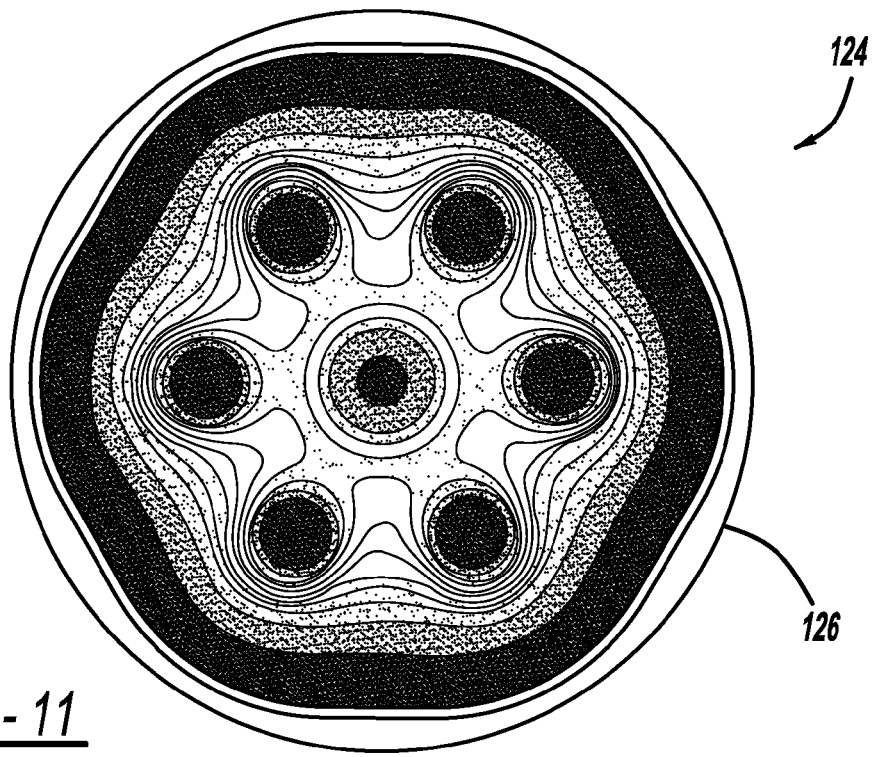
FIG. 11 is a profile of a near-field beam intensity distribution of the seven fiber bundle shown in FIG. 10 after being tapered.

Tapering down this seven fiber input bundle to an assumed 6.9 μm core diameter in a 17.2 μm core-core spacing yields a very different combined output beam as shown by the near-field intensity distribution 124 in FIG. 11, where ring 126 is the assumed reference diameter. The near-field reference aperture diameter in this case is chosen to be 69 μm, which contains greater than 99% of the combined power. The combined tapered fiber bundle output, because of the greatly increased mode overlap and fill factor, now has a very high efficiency of focus into a diffraction limited far-field bucket. It can be shown that the PIB of seven ideally phased beams is about 92% into the diffraction limited angular radius $1.2\lambda/D_{ref}$. Note that this PIB exceeds the 84% achieved by a diffraction limited and fully filled flat top beam. The PIB of the seven combined beams increases to about 95% within a radius of $1.5\lambda/D_{ref}$. Therefore, it can be shown that the effect of the tapered fiber bundle 72 is to dramatically increase the fill factor and PIB compared with the input fiber bundle.

For a given core geometry, an effective area of the combined beam can be defined based on the peak intensity, which can be used to define a maximum power before intensity driven damage becomes an issue, where the peak intensity of the combined beam of power P is defined as $I_{peak}=P/A_{eff}$. For the seven beam combination with the tapered fiber bundle discussed above, $A_{eff}=630$ μm$^2$, whereas a single constituent beam at the tapered fiber bundle output has an effective area of 80 μm$^2$, and hence the effective area is increased by 7.8 times over a single beam.

Figure 12:
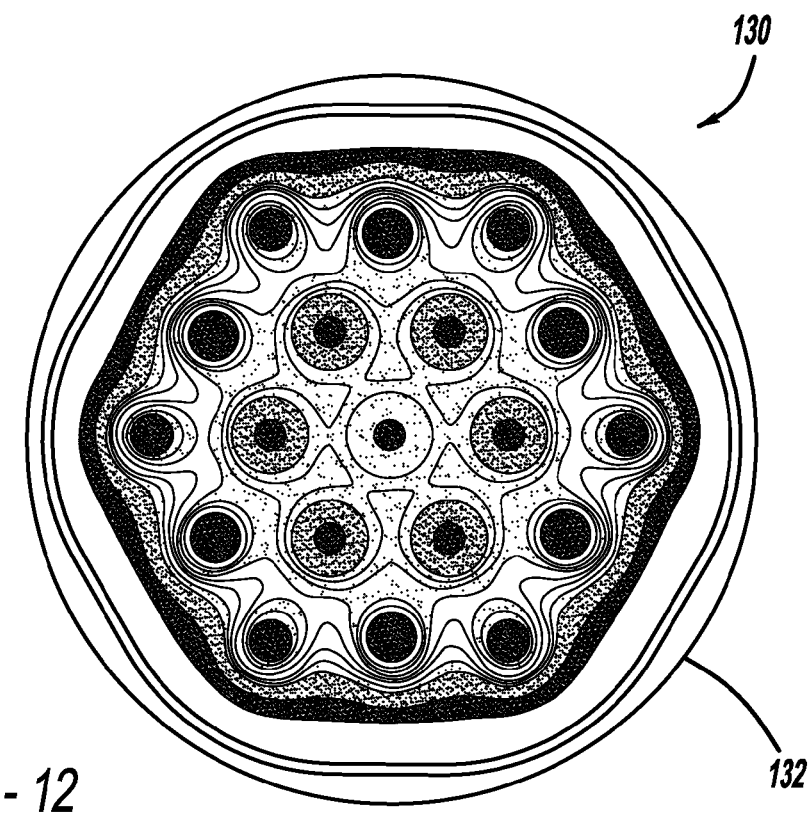
FIG. 12 is a profile of a near-field beam intensity distribution of a closely packed nineteen fiber bundle.

For higher power, a larger number of input fibers can be employed. For hexagonal close packing, the next magic number with an additional ring of fibers is nineteen, which, based on the above core diameters of spacing, yields an effective area of about 1860 μm$^2$, and thus would enable more than 60 kW in a single tapered fiber bundle output, assuming ~3 kW per input beam. A near-field intensity distribution 130 of an output of a tapered fiber bundle with a ring aperture 132 is shown in FIG. 12, where the aperture reference diameter is 96 μm.

As described above, it has been assumed that the super-mode formed in simply the coherent in-phase super position of the individual fiber modes. By symmetry, if the six outer beams have phases locked and equal, then there are just two modes of interest, where the central beam is either in phase or out of phase, referred to as the in-phase |+> and out-of-phase |−> super-modes, respectively. Therefore, the above results depend on suppression of the out-of-phase |−> super-mode by proper phasing of the input beams. The use of the phase-locking systems can certainly ensure that the central beam at the output has the proper relative phase with respect to the outer beams. However, because of the large mode overlap between the constituent fibers and the tapered fiber bundle 72, there is considerable power exchange between the cores. Simulations show that for the above example core diameter at the end of the taper, power launched in the central core would couple from the central beam to the outer beams in about a 2.5 mm propagation distance. Therefore, to ensure the desired uniform power distribution of the beams, besides proper phasing of the input fields, the length and taper of the taper fiber bundle 72 must be tailored. In fact, the central peak in the assumed output beam has about 30% higher power than the outer peaks of the beam. Hence, by designing the length of the tapered fiber bundle 72 so that the power coupling between cores reduces the central core power somewhat, the peaks can be evened out and a reduction in the peak intensity for a given total array power can be provided, thereby increasing the total power limit for a given damaged threshold. The required design accuracy for a few percent power balance, based on the simulated 2.5 mm coupling distance is a few 100 microns, which should be easily achieved.

Current commercial high power tapered fiber bundle packages have dissipation capabilities of about 100 W, and this is likely to grow as development of these devices continues. Reports of multi-mode pump couplers used for fiber amplifiers combining over 1 kW is routine with the pump throughputs achieved at greater than 98%. These commercial devices generally attempt to maximize pump brightness by coupling a tapered fiber bundle to an output fiber with an angular acceptance only slightly larger than the effective cumulative acceptance of the input. Therefore, these devices generally have a significant, i.e., greater than 1%, coupling losses. In the type of tapered fiber bundle proposed here, there is no loss from coupling to an output fiber because only an end cap is employed. The intrinsic absorption losses of high quality transmission fibers that is used in the tapered fiber bundle is very low, i.e., less than 10 PPM/cm, and therefore is not expected to be a limiting factor.

The remaining losses result from large angle mode conversion and scattering during propagation or near the end of the taper of the tapered fiber bundle. This will of course depend on the design and quality of fabrication of the tapered fiber bundle. However, the LMA input fibers of interest have quite a low NA, i.e., approximately 0.06, and the angular divergence of this input light is limited even including the residual power in the mode wings. For example, a 25 μm/0.06 NA LMA fiber mode has less than 100 PPM residual power propagating at angles larger than about ±10 mrad. Even the mode of the small 6.9 μm core at the end of the tapered fiber bundle described above has less than 100 PPM of residual power outside angles of ±0.2 rad. Heating within the tapered fiber bundle package is likely to be dominated by large angle out-coupled light that is absorbed by tapered fiber bundle cladding materials. Therefore, the use of a moderate NA glass cladding material in the tapered fiber bundle, which is virtually non-absorbing, should greatly mitigate heating from all but very large angles scattering within the tapered fiber bundle. For example, fluorine-doped glasses can be used as a cladding material with an NA limit of approximately 0.3, and thus can confine any lower angle scattered light to prevent absorption into the tapered fiber bundle package and allow escape through the end cap.

Figure 13:
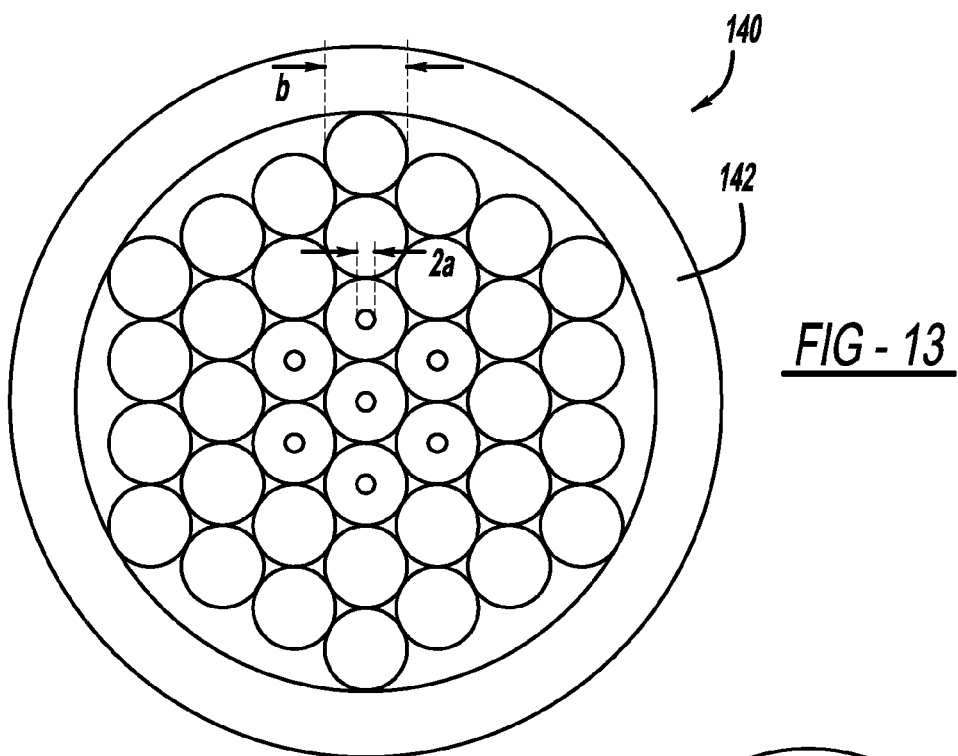
FIG. 13 is a cross-sectional view of an input end of a tapered fiber bundle including a low index glass cladding.
Figure 14:
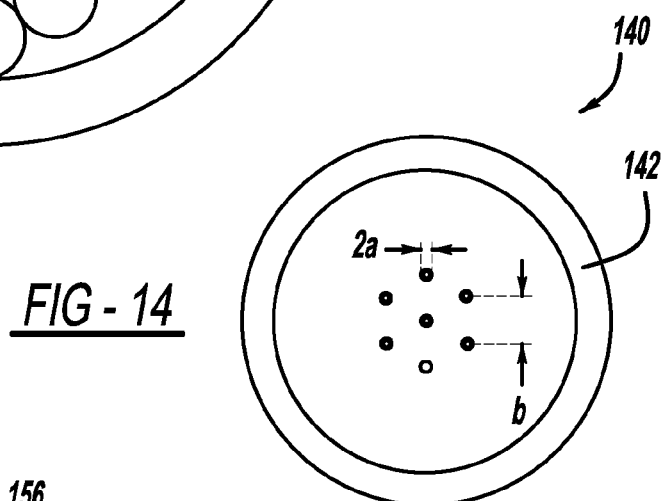
FIG. 14 is a cross-sectional view of an output end of the tapered fiber bundle shown in FIG. 13 including the low index glass cladding.

FIG. 13 is a cross-sectional view of an input end of a tapered fiber bundle 140 including an outer low index of refraction glass tube 142, and FIG. 14 is a cross-sectional view of an output end of the tapered fiber bundle 140 showing the glass tube 142, as discussed above.

As discussed above, the end cap 74 is used to get the combined high power beam out of the glass without damage or degradation of beam quality. As discussed, the purpose of the end cap 74 is to allow the beam to expand sufficiently so that the intensity at the exit surface is below the damaged threshold. Secondly, it must be ensured that the power reflected from that surface does not adversely affect the fiber amplifier performance. Therefore, it is typically preferable to provide an anti-reflective (AR) coating on the output face of the end cap 74 to minimize reflections. For the small beams being discussed herein, it has been reported that damage thresholds greater than about 1 MW/cm$^2$ are achievable. For a 20 kW output beam, this implies the beam must expand to an effective area of about 2 mm$^2$. For the seven beam combination discussed above, the effective $1/e^2$ diameter of the combined beam as it enters the end cap 74 is about 45 μm, and the aggregate divergence angle is thus quite small, i.e., the angle is approximately ±0.01 at $1/e^2$ in glass, so that a long propagation distance is required to reduce the peak intensity. Calculations show that the peak intensity is reduced to about 1 MW/cm$^2$ for a 20 kW seven beam output after propagation of about 11 cm at which point the beam is roughly Gaussian with an FWHM of approximately 1.3 mm. Therefore, the lens cap diameter will need to be increased to about 5 mm either in a tapered fashion or in segments to accommodate the expanding beam at the output facet, as will be discussed below.

Even with the very low absorption end caps, the long propagation distance in glass poses a difficulty from accumulated thermal optical path distortion (OPD). However, this is mitigated by the high aspect ratio of the end cap 74, since the beam is at its largest at about 1 mm. Surface cooling of the end cap 74 should be adequate, but there will still be an unavoidable quadratic temperature variation because of the intrinsic absorption in the end cap 74. Approximating the heat deposition as uniform over the extent of the beam, the temperature difference induced by the absorption over the beam width is approximately $\Delta T = P\alpha/4\pi k = P\alpha/180°$ C., where P is the total beam power in kW, $\alpha$ is the intrinsic glass absorption in PPM/cm, and the glass conductivity is $\kappa = 1.4$ W/m-° C. The OPD in glass is about 1.3 waves per cm of length and ° C. of temperature difference, and therefore for a 20 kW beam and 10 cm path length, the maximum OPD is about $\alpha/7$ waves. Ultra-low absorption fused silica has been reported with $\alpha < 1$ PPM/cm, so the OPD is not overwhelming, and mostly spherical, however, this issue can present serious limitations to power scaling with this method. This illustrates that thermal management of the end cap 74 for fiber schemes that operate at 10+ kW power levels will be quite important for minimizing OPD.

As the number of beams scales up, this issue is exacerbated because the combined beam has a larger effective diameter, i.e., about 70 μm, and thus, even smaller divergence. For the nineteen beam combination discussed above, the calculated divergence angle at $1/e^2$ is about ±7.2 mrad in glass, and combined with the larger 60 kW total power, would require about a 27 cm long end cap to reduce the exit intensity to about 1 MW/cm$^2$. The predominate problem is the very small divergence of the combined beam.

Figure 15:
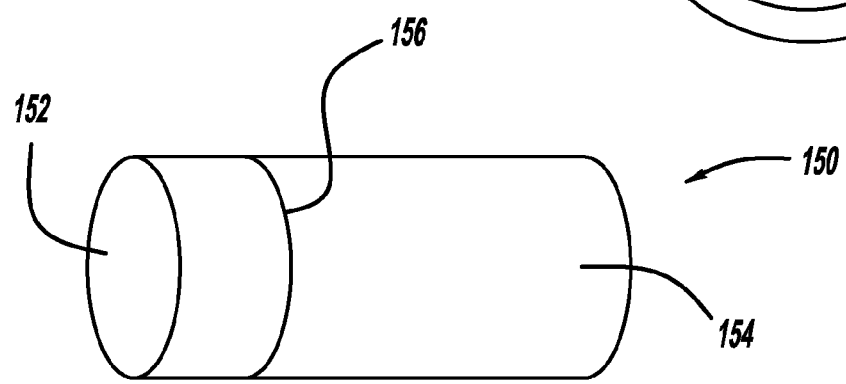
FIG. 15 is a perspective view of an end cap for a tapered fiber bundle including a negative GRIN lens.

One approach to mitigating this issue is to fabricate an end cap that includes a negative gradient index (GRIN) lens close to the tapered fiber bundle splice. FIG. 15 is a perspective view of an end cap 150 including a negative GRIN lens 152 that is coupled to the tapered fiber bundle. The remaining portion of the end cap 150 is a uniform glass rod 154 where the GRIN lens 152 and the glass rod 154 are optically coupled by a suitable splice 156. The negative focal length lens can increase the divergence of the combined beam significantly, and thus, reduce the required end cap length to a few cm, thereby greatly reducing the accumulated OPD in the end cap 150. For example, a GRIN lens with a focal length of −0.8 mm will increase the divergence of the seven beam tapered fiber bundle output by roughly three times, and thus, reduce the OPD for a 20 kW output beam proportionally to about $\alpha/20$ waves. Such an approach could make scaling of this scheme to single aperture powers approaching 100 kW within reach.

Figure 16:
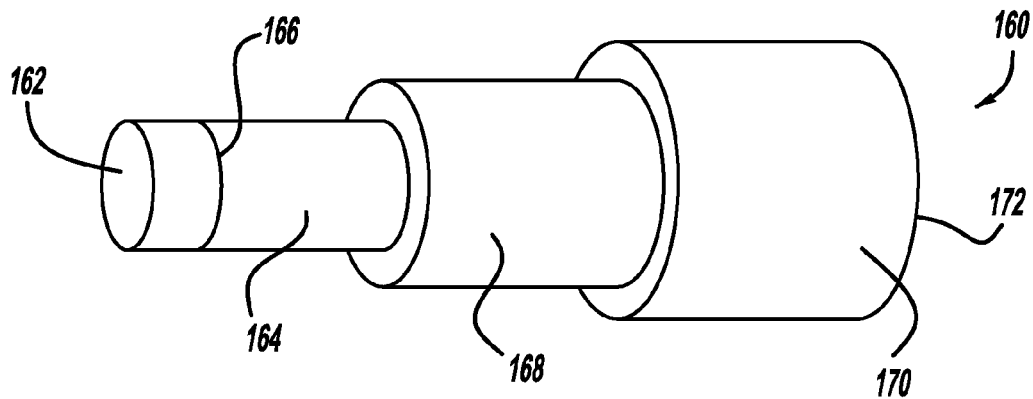
FIG. 16 is a perspective view of a segmented end cap for a tapered fiber bundle.

The diameter of the end cap 74 could be increased in segments or by a taper to accommodate the expanding beam. FIG. 16 is a perspective view of an end cap 160 including stepped segments, where a negative GRIN lens 162 is coupled to the tapered fiber bundle and to a uniform glass rod 164 of about the same diameter by a splice 168. An opposite end of the glass rod 164 is spliced to a larger diameter glass rod 166, which in turn is spliced to an even larger diameter glass rod 170 to provide the segments for the beam expansion. An anti-reflective coating 172 can be provided on an output surface of the glass rod 170 opposite to the GRIN lens 162.

Figure 17:
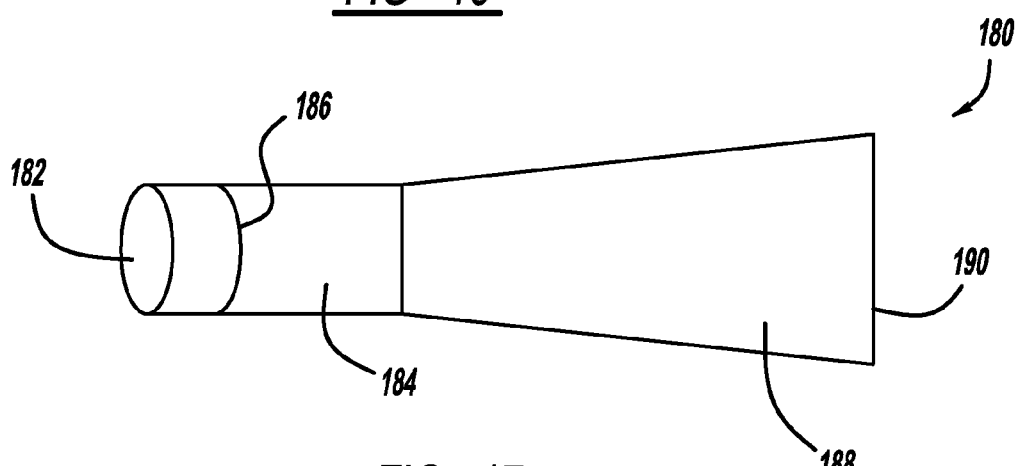
FIG. 17 is a perspective view of a tapered end cap for a tapered fiber bundle.

FIG. 17 is a perspective view of an end cap 180 including a negative GRIN lens 182 to be coupled to the tapered fiber bundle at one end and coupled to a uniform glass rod 184 of about the same diameter by a splice 186 at an opposite end. A tapered glass rod 188 is then coupled to the uniform glass rod 184 where a wide end of the tapered glass rod 188 includes an anti-reflective coating 190.

With a standard AR coating reflectivity of 0.2%, the reflected power for 20 kW is only 40 W in an expanded beam, so the fraction of this reflection that re-enters the small tapered fiber bundle output fiber should be straight forward to be limited to small and safe powers.

For a large aperture beam director, it would be desirable that the magnified image of the tapered fiber bundle near-field be relayed to the beam director aperture. This is accomplished by the telescope 76 where the lens 78 has a focal length $f_1$ and the lens 80 has a focal length $f_2$ and where the lenses 78 and 80 are separated by $f_1+f_2$, which magnifies the image by length $f_2/f_1$.

Figure 18:
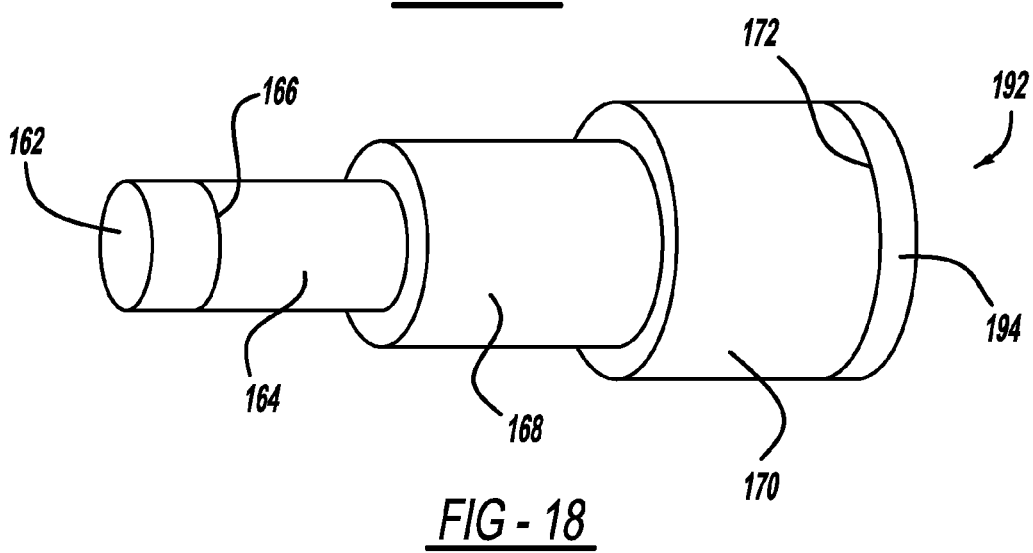
FIG. 18 is a perspective view of a segmented end cap for a tapered fiber bundle including a positive GRIN lens.

It is possible to integrate the lens 78 into the end cap 74 by using a spherical exit surface on the end cap 74 or by splicing a focusing GRIN lens at the end cap output. FIG. 18 is a perspective view of an end cap 192 similar to the end cap 160, where like elements are identified by the same reference numeral. The end cap 192 includes a positive GRIN lens 194 mounted to the anti-reflection coating 172 that operates as the lens 78. Such optical arrangements can be integrated directly into the beam director telescope as well. More compact telescopes of standard designs for high magnification that use both positive and negative lenses can also be implemented to optimize the footprint of the expansion optics.

In order to maintain proper beam quality, it is necessary that the polarization of the fiber beams in each of the fiber amplifiers 18 have the same orientation. For the system 70, the fibers employed in the fiber amplifiers 18 are polarization maintaining fibers so that all of the beams in all of the fibers have the same polarization orientation. In certain applications, such as high power applications, it may not be feasible to use polarization maintaining fibers, and thus, it becomes necessary to align the polarization of each of the fiber beams in the fiber amplifiers 18.

Figure 19:
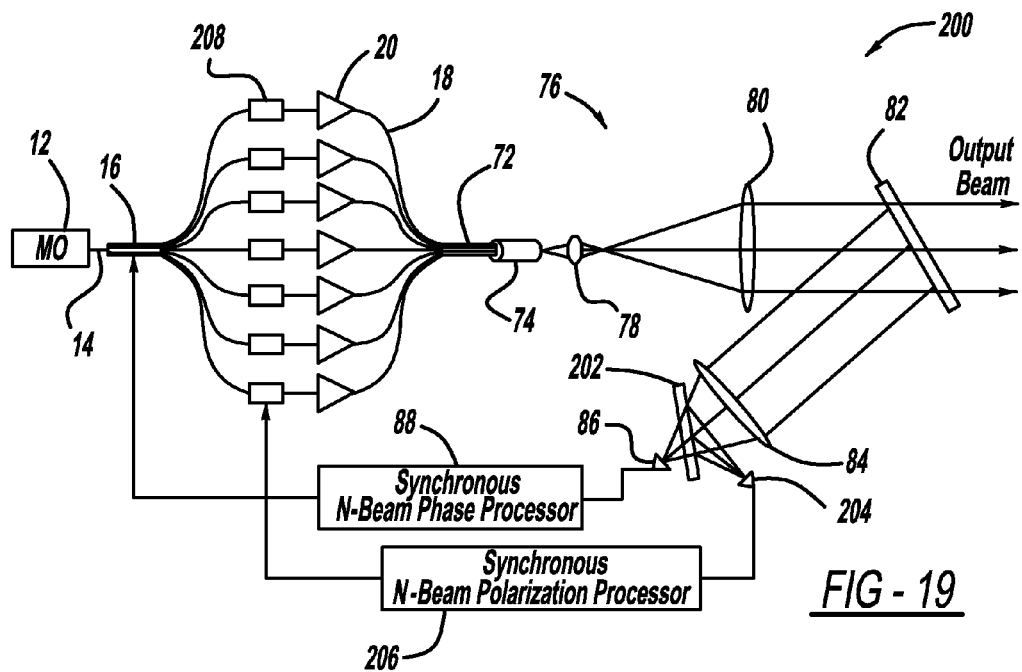
FIG. 19 is a schematic plan view of a fiber laser amplifier including a tapered fiber bundle, a phase detector and fiber polarization controllers.

FIG. 19 is a schematic plan view of a fiber laser amplifier system 200 that does not employ polarization maintaining fibers, where like elements to the system 70 are identified by the same reference number. The system 200 uses a polarizer 202 to determined the polarization of the fiber beams in the sampled beam from the sampler 82. As the polarization in the fiber beams changes relative to each other, the polarizer 202 causes more or less light to be directed to a polarization detector 204. The polarization detector 204 uses distinct frequency dithers or tags on the individual beams to determine the polarization of each beam in the output beam. The measurement of the polarization is provided to a synchronous N-beam polarization processor 206 that determines the relative orientation of the polarizations in the beams. The processor 206 uses the distinct dither frequencies or tags to identify the fibers for all measured polarization changes and provides signals to polarization controllers 208 for the corresponding fiber amplifiers 18 to control the polarization orientation in each fiber so that they are the same. Such a polarization controlling system has been proposed in U.S. Pat. No. 6,317,257, issued Nov. 13, 2001 to Upton et al., titled Technique for Polarization Locking Optical Outputs, assigned to the assignee of this application and herein incorporated by reference.

Forming the fiber amplifiers 18 into the tapered fiber bundle 72 provides a number of challenges. It is desirable to provide a certain ratio of fiber core to fiber diameter and to provide the fiber cores as closely spaced together as possible. Further, for fibers of the diameters being discussed herein, the flexibility of the fibers limits the handling ability of the fibers. Multi-core fibers are known in the art that include multiple cores coupled together in a bundle surrounded by a common cladding layer. Such a multi-core fiber would be easier to handle and be formed into a tapered fiber bundle as discussed above. However, it is then necessary to get the fiber beams into the individual cores within the multi-fiber core. Further, it is known in the art to provide an outer air cladding around the individual cores in the multi-core fiber to provide high NA confinement of pump light within the cladding around each core.

Figure 20:
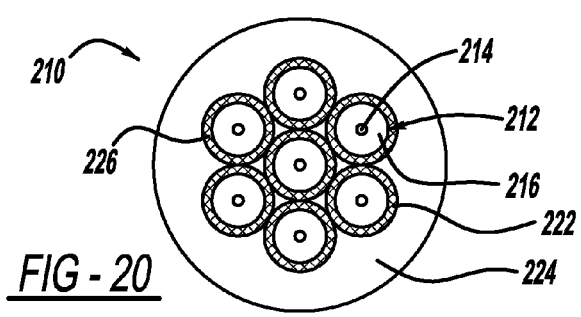
FIG. 20 is a cross-sectional view of a multi-core fiber.

FIG. 20 is a cross-sectional view of a multi-core fiber 210 of the type discussed above. The multi-core fiber 210 effectively includes a plurality of individual fibers 212 each including a core 214 and an inner cladding layer 216. Further, each individual core 214 and inner cladding layer 216 is surrounded by an outer air cladding 222 that is formed by a number of small glass air bridges 226 making the air cladding effectively all air, in a manner that is well understood to those skilled in the art. By providing the air cladding 222 around the individual cores 214, the individual fibers 212 can be separated from a multi-core fiber body 224 by chemically etching the air bridges 226 within the air cladding 222 and the glass in the multi-core fiber body 224.

Figure 21:
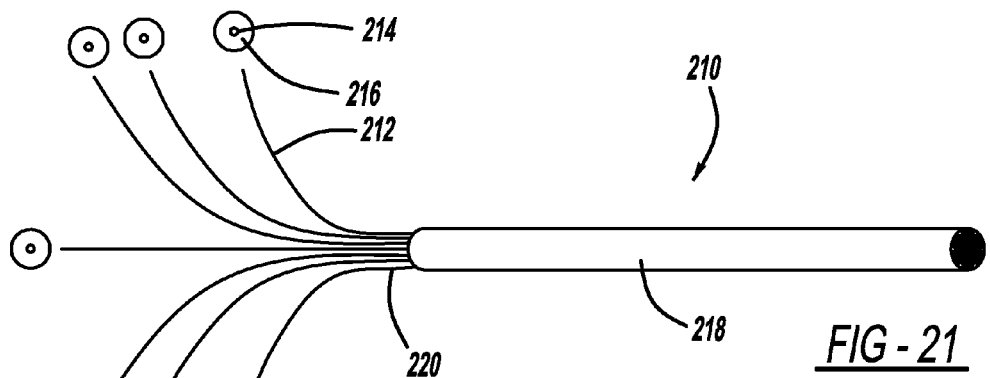
FIG. 21 is an illustration of the multi-core fiber shown in FIG. 20.

FIG. 21 is a plan view of the multi-core fiber 210 where the individual fibers 212 have been separated to form pigtails extending from the multi-core fiber portion 218. In one embodiment, the multi-core fiber body 224 and air claddings 222 are etched using hydrofluoric acid, or another suitable chemical agent, to separate the individual fibers 212 from the portion 218 so that now the individual fibers 212 can be coupled to the fiber amplifiers 18. Because the multi-core fiber portion 218 has a significantly larger diameter than the individual fibers 212, it can be more easily handled to form a tapered fiber bundle of the types discussed above. It is noted that in the taper process, appropriately high temperatures must be applied and perhaps a vacuum so that the bridges in the air claddings 222 collapse so that the fiber cladding layers 216 are continuous between the cores and the multi-core fiber body 224. This enables the modes confined in each core 214 to spread and overlap with the other modes in the tapered region of the multi-core fiber 210.

Figure 22:
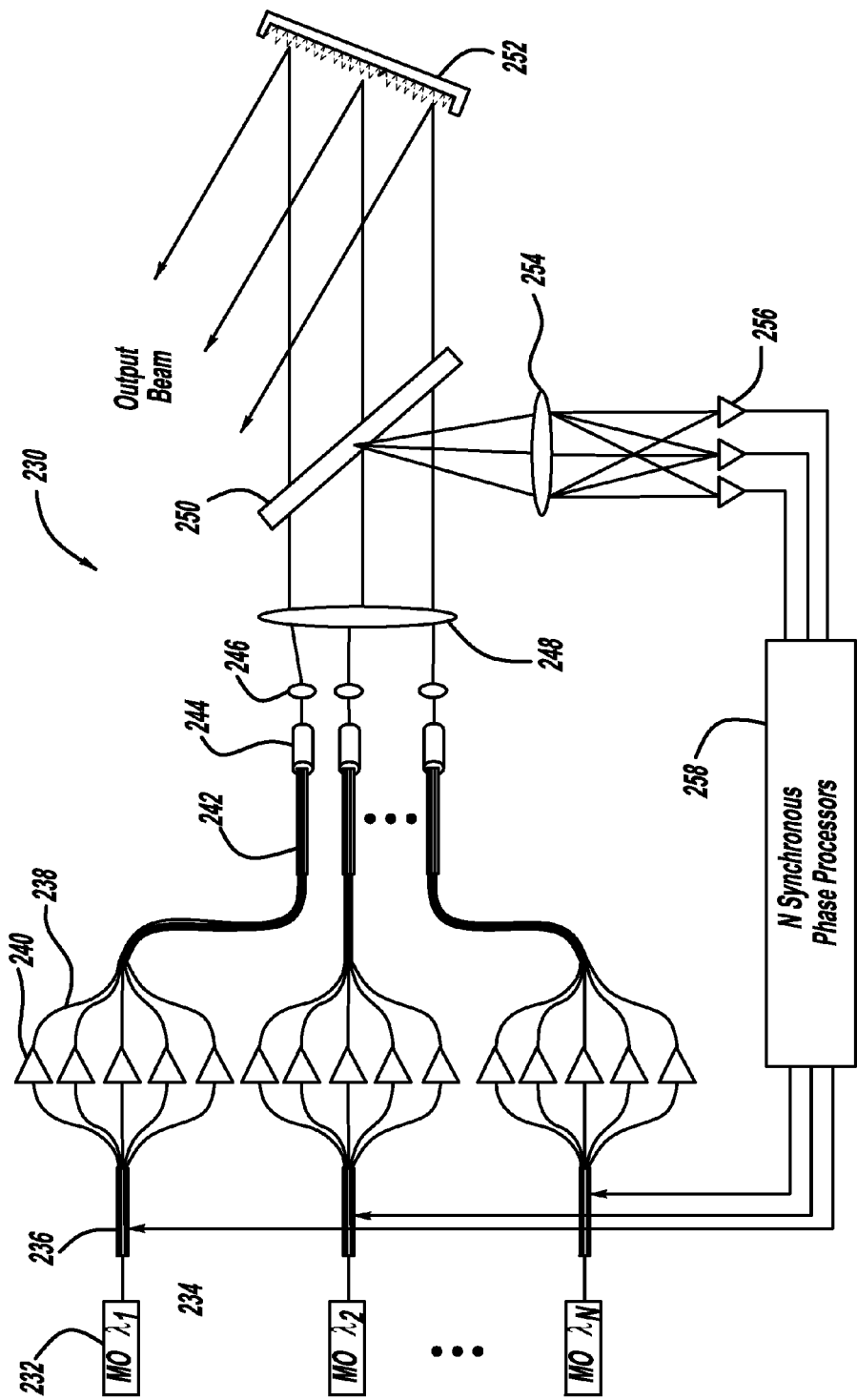
FIG. 22 is a schematic plan view of a fiber laser amplifier including a plurality of master oscillators, tapered fiber bundles and phase detectors.

The embodiments discussed above can be extended to other types fiber laser amplifier systems to further increase the output power of the system. FIG. 22 is a schematic plan view of a fiber laser amplifier system 230 that combines multiple beams using spectral beam combination (SBC) to increase the beam power. In the system 230, a plurality of N master oscillators 232 individually provide beams on fibers 234 that are at different wavelengths ($\lambda_1, \lambda_2, \ldots \lambda_N$). Each master oscillator wavelength is then split into M fibers by M splitters and phase modulators 236 in the manner as discussed above. The separate fibers from each splitter and phase modulator 236 is then coupled to a fiber amplifier 238 represented by amplifier 240. The fiber amplifiers 238 are then coupled to a tapered fiber bundle 242, which is coupled to an end cap 244 in the manner as discussed above. The tapered fiber bundle 242 and the end cap 244 can be any of the tapered fiber bundle and/or end cap embodiments discussed above.

The N tapered fiber bundles are arranged in a linear array, which is placed at the back focal plane of common collimating optics 248. The output from each end cap 244 is focused by a telescope lens 246 and the combined beams for all of the master oscillator wavelengths are collimated by the collimating optics 248. The collimated beams from the collimating optics 248 are then sampled by a beam sampler 250 where most of the beam is sent to an SBC grating 252. The SBC grating 252 is placed in the opposing focal plane of the collimating optics 248 and its dispersion along with the master oscillator wavelengths, spacing between adjacent tapered fiber bundles and collimating optic focal length are chosen so that each beam is precisely co-propagating with all of the other beams after diffraction by the SBC grating 252. Thus, all of the beams for each master oscillator wavelength are focused to the same spot as all of the other master oscillator beam wavelengths.

The beam sampler 250 provides a small sample of the collection of N beams incident on the grating 252, each of which is propagating at a slightly different angle. Focusing optics 254 focuses the combined beam onto N separate phase detectors, where each detector 256 measures the phase relationship among the M beams at each separate master oscillator wavelength. As above, a frequency tag is placed on each individual fiber beam for each separate master oscillator wavelength so that the measurement signals from the detectors 256 is received by a synchronous phase processor 258 that adjusts the phase modulators 236 in each wavelength group as discussed above. Thus, the signal from each of the N phase detectors 256 is used to phase lock each group of M beams combined by the tapered fiber bundle 242 at each of the N respective wavelengths. The phase signal is synchronously processed to distinguish which of the M fibers in a group the phase error originates and provides correction signals to the appropriate modulators 236 so that the beams within each wavelength group are optimally phase locked. In this embodiment, the fiber amplifiers 238 are polarization maintaining fibers to ensure a coherent and polarized output beam, and thus the highest possible diffraction efficiently from the SBC grating 252 can be achieved, which is typically much more efficient for one polarization state than the other.

Figure 23:
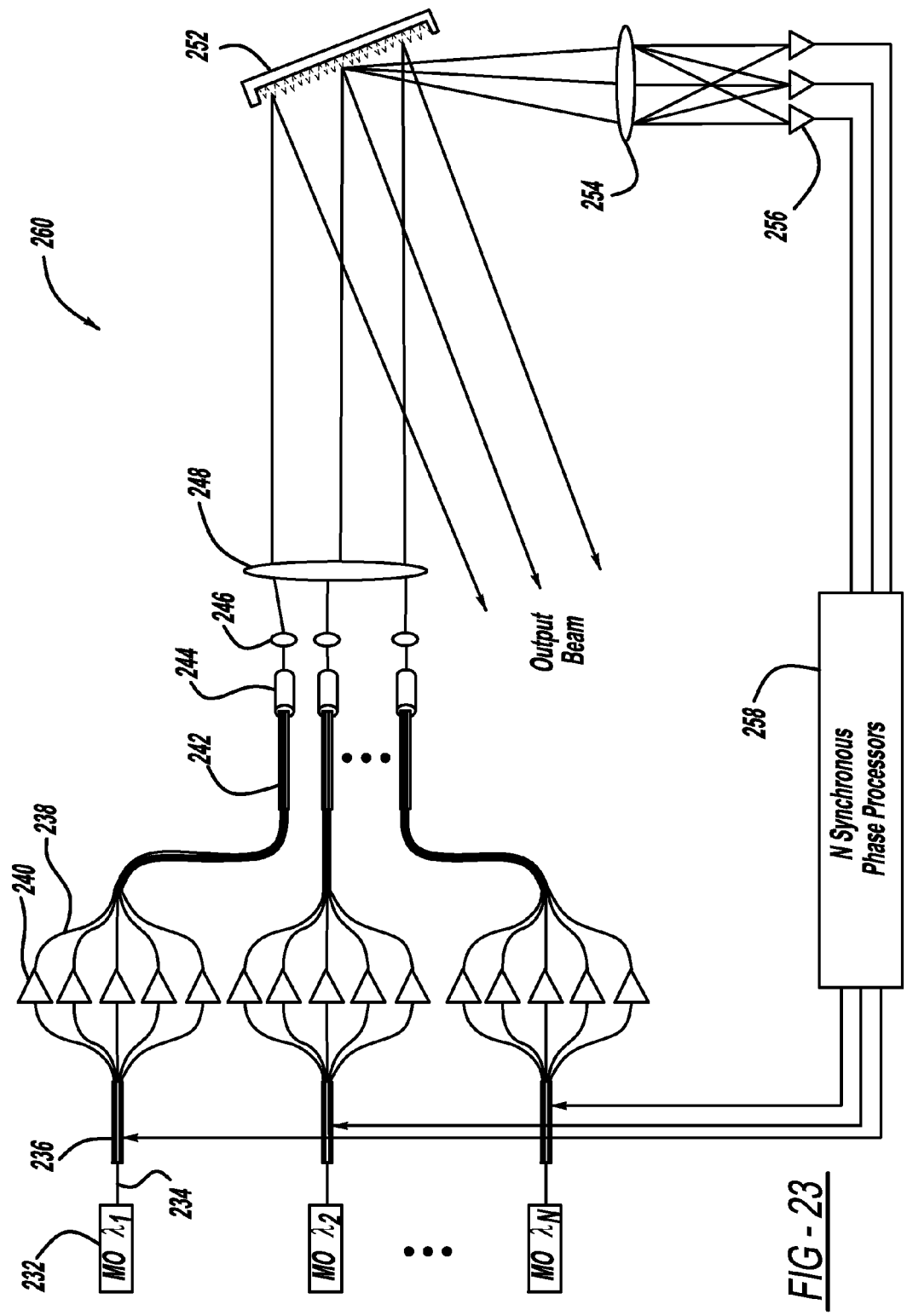
FIG. 23 is a schematic plan view of a fiber laser amplifier including a plurality of master oscillators, an SBC grating and a plurality of phase detectors.

FIG. 23 is a schematic plan view of a fiber laser amplifier system 260 similar to the system 230, where like elements are identified by the same reference number. The system 260 is a simplified design over the system 230 that takes advantage of the zeroth order reflection from the SBC grating 252. The first order reflection off of the SBC grating 252 is the main beam focused to the desired location, where a partial portion of the beam is reflected off the SBC grating 252 as the zeroth order. Because the reflection of the zeroth order off the SBC grating 252 for each separate wavelength group is slightly different, the focusing optics 254 can focus the separate beams onto the particular detector 256, as discussed above. Thus, the system 260 does not need the beam sampler 250.

Figure 24:
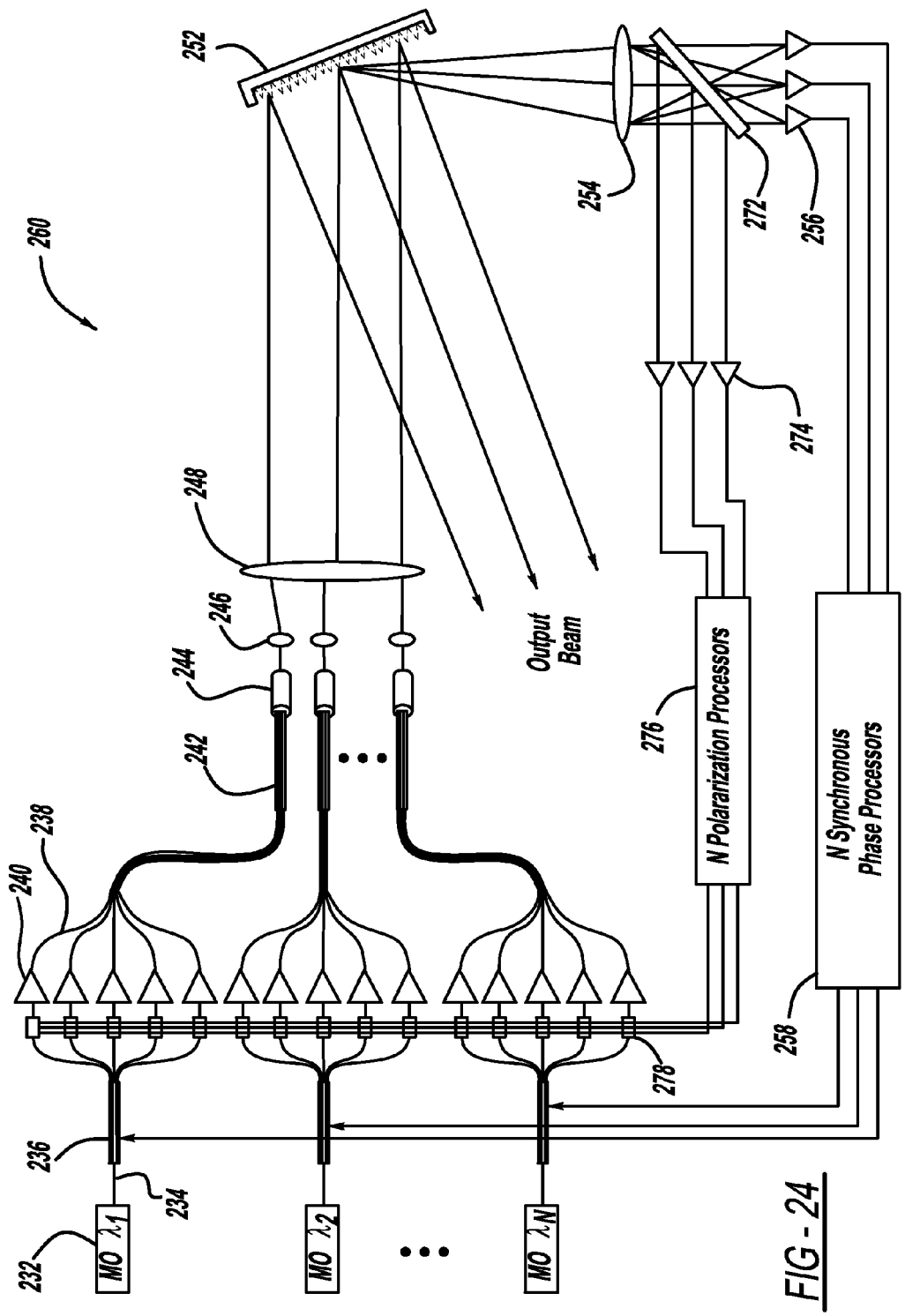
FIG. 24 is a schematic plan view of a fiber laser amplifier including a plurality of master oscillators, an SBC grating, phase detectors and fiber polarization controllers.

FIG. 24 is a schematic plan view of a fiber laser amplifier system 270 similar to the system 260, where like elements are identified by the same reference number. The system 260 used polarization maintaining fibers, which may or may not be feasible at high power. The system 270 does not employ polarization maintaining fibers in the fiber amplifiers 256, and thus a technique needs to be used to provide polarization orientation between the fiber beams in each separate master oscillator wavelength group. In order to do this, the system 270 employs a polarizer 272 between the focusing optics 254 and the detectors 256 that directs part of the beams to N polarization detectors 274 that measure the polarization of each separate wavelength group. The sampled beams may be provided by the $0^{th}$ order grating reflection shown in the system 270, or by a separate sampling optic as shown in the system 230. The measured signals from the detectors 274 are provided to N polarization processors 276 that determine the relative polarization orientation between the M fiber beams in each of the N wavelength groups, and provide a suitable signal to M polarization controllers 278 at the low power side of each of the M fiber amplifiers 238.

The SBC grating 252 provides better beam quality and less divergence if the beams from the master oscillators 232 have a very narrow beam bandwidth. However, by providing a narrow beam bandwidth from the master oscillator 232, acoustic affects within the various fibers and other optical components cause stimulated Brillouin scattering (SBS) that tends to damage optical components. Therefore, it is desirable to increase the beam bandwidth of the master oscillator signals to prevent SBS, which results in lower beam quality as mentioned.

Figure 25:
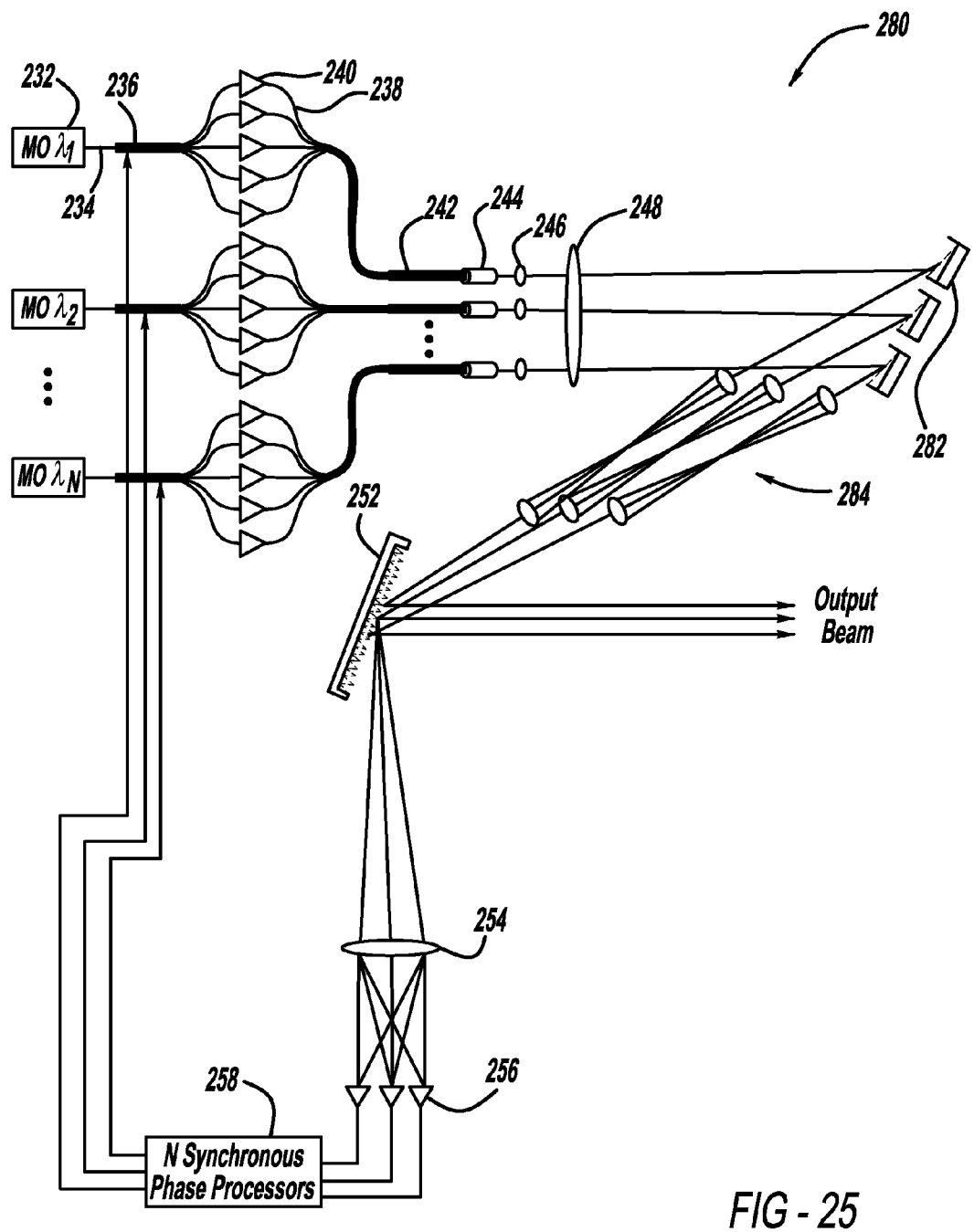
FIG. 25 is a schematic plan view of a fiber laser amplifier including a plurality of master oscillators, a plurality of pre-dispersion gratings and an SBC grating.

FIG. 25 is a schematic plan view of a fiber laser amplifier system 280 that allows a wider beam bandwidth master oscillator, but provides a narrower beam bandwidth at the SBC grating 25, where like elements to the system 260 are identified by the same reference number. To provide this feature, the system 280 includes N pre-dispersion gratings 282, one for each wavelength group. The dispersion gratings 282 provide dispersion compensation that has essentially the same dispersion as the SBC grating 252, but is oriented oppositely so as to cancel the net dispersion for each wavelength group beam. The dispersion gratings 282 are oriented so that the beams overlap on the SBC grating 252 and are incident at the correct angle to provide co-propagation of the diffracted beams. The beam quality is optimized when the beams from the dispersion gratings 282 are imaged onto the SBC grating 252 using image relay telescopes 284. The relay telescope optics may be cylindrical to allow for a large beam width in a direction orthogonal to the dispersion direction so that the intensity on the grating surface is maintained below the optical damage threshold.

Figure 26:
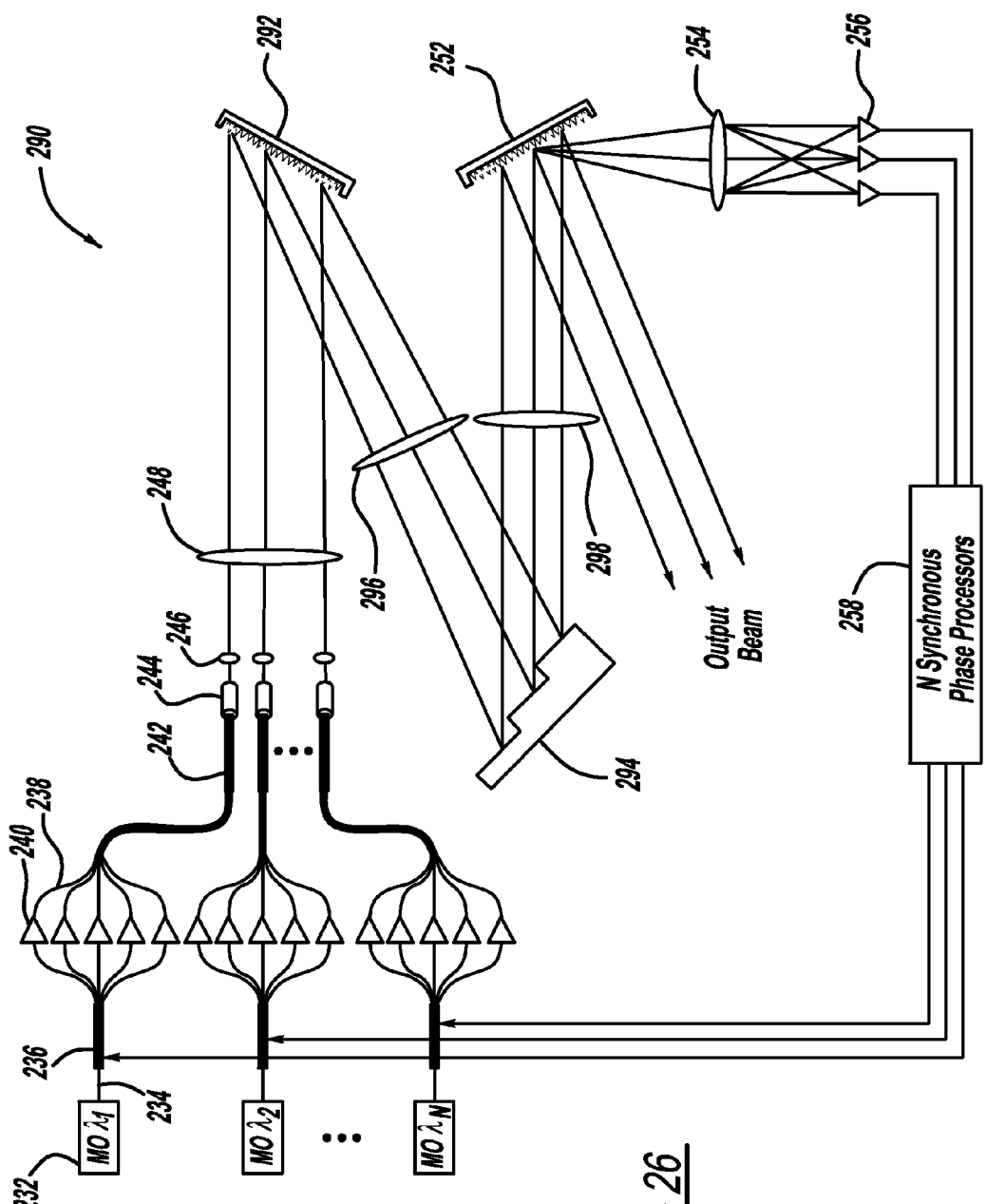
FIG. 26 is a schematic plan view of a fiber laser amplifier including a plurality of master oscillators and an SBC grating a staircase mirror.

In the system 280, the dispersion gratings 282 must be individually and precisely aligned with the SBC grating 252 in the manner discussed above, which can be cumbersome and complex. FIG. 26 shows an alternate embodiment for a fiber laser amplifier system 290 that helps with this problem, where like elements to the system 280 are identified by the same reference number. In the system 290, the individual dispersion gratings 282 are replaced with a single pre-dispersion grating 292 that operates in the same manner. The individual beam wavelength groups are reflected off of the pre-dispersion grating 292 at different angles, which need to be corrected before they impinge the SBC grating 252 so that all the beams are directed to the beam spot. A staircase mirror 294 is provided having an individual stair step for each beam wavelength group, where the steps are appropriately chosen to have step heights and widths to allow the beams to have the proper angles so that all beams are co-aligned after diffraction from the SBC grating 252. For high power applications, cylindrical optics 296 and 298 are provided in the beam path between the pre-dispersion grating 292 and the SBC grating 252 so as to spread the power density of each of the beams to a line focus or a near-focus on a different step of the staircase mirror 294 in order to limit the peak intensity below the optics damage threshold. The pre-dispersion grating properties and the incident angles are chosen to cancel the dispersion of the SBC grating 252. One design with essentially no net dispersion is to use identical gratings with opposite orientations for the pre-dispersion and SBC gratings.

Figure 27:
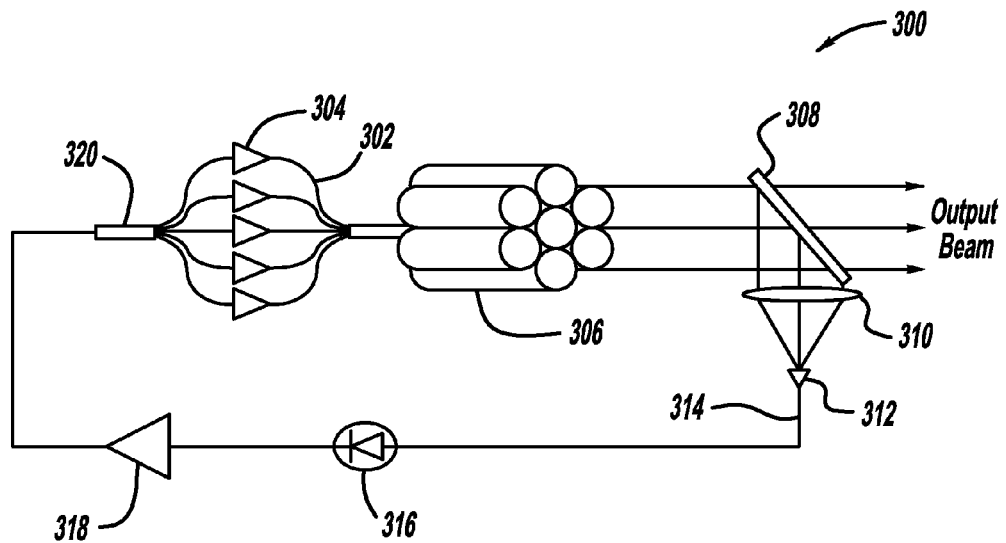
FIG. 27 is a schematic plan view of a known fiber laser amplifier including a feedback single mode fiber and a pre-amplifier.

FIG. 27 is a schematic plan view of a known fiber laser amplifier system 300, such as the type disclosed in U.S. Pat. No. 7,130,113, issued Oct. 31, 2006 to Shakir et al., titled Passive Phasing of Fiber Amplifiers, assigned to the assignee of this application and herein incorporated by reference. The system 300 is different than the amplifier system 10 and others described above because it does not employ a master oscillator, but instead employs a light feedback loop. The amplifier system 300 includes fiber amplifiers 302 represented by amplifiers 304 that are pumped by a pump beam (not shown) to generate the optical amplification. The amplified signals from the fiber amplifiers 302 are then sent to a lens array 306 of the type discussed above that collimates the fiber beams. The individual lenses in the lens array 306 must be precisely aligned so that all of the fiber beams are co-propagating in the same direction. The co-propagating beam from the lens array 306 is sampled by a beam sampler 308 where most of the beam passes through the beam sampler 308 as the system output beam. The sampled portion of the beam from the beam sampler 308 is focused by a coupling lens 310 and collected by a collector 312 to be sent through a single mode fiber 314 that provides the beam feedback. Because the fiber 314 is single mode, it passively provides the phase alignment of the fiber beams in the fiber amplifiers 302, as opposed to the active controls provided by electrical feedback to the phase modulators discussed above. An optical isolator 316 is provided in the single mode fiber 314 so that light only propagates in the feedback direction. The feedback beam is amplified by a pre-amplifier 318 and split by a beam splitter 320 to provide the fiber beams for the several fiber amplifiers 302. This technique has been shown to be effective in passively locking the phases of the fiber amplifiers 302, but still suffers from the fill-factor problem discussed above with reference to the system 10.

Figure 28:
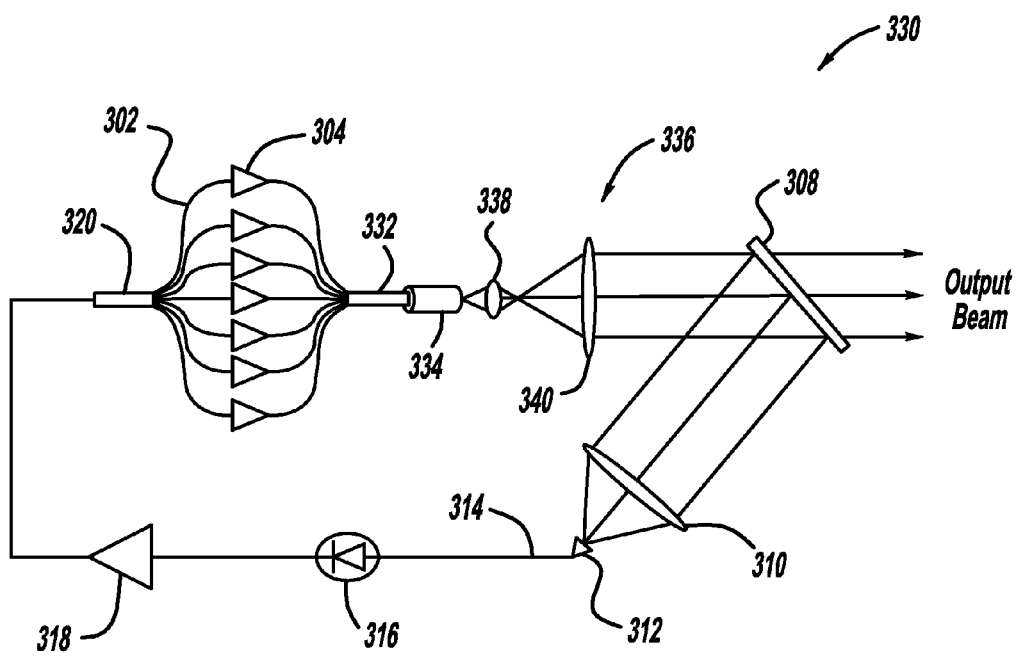
FIG. 28 is a schematic plan view of a fiber laser amplifier including a tapered fiber bundle, a feedback single mode fiber, a pre-amplifier and a beam sampler.

The system 300 can also be improved to be more compact in design and reduce the optical components that require alignment by employing a tapered fiber bundle in the same manner as discussed above. FIG. 28 is a schematic plan view of a fiber laser amplifier system 330 showing this embodiment, where like elements to the system 300 are identified by the same reference numeral. The system 330 includes a tapered fiber bundle 332 that couples the fiber amplifiers 302 in the manner discussed above to provide beam overlap at the output of the tapered fiber bundle 332. An end cap 334 is coupled to the tapered fiber bundle 332, and can be any of the various end cap embodiments discussed above. An output beam from the end cap 334 is collected by a collimating and magnifying telescope 336 that includes focusing optics 338 and collimating optics 340. Thus, the system 330 solves the fill factor problem of the system 300 in a compact design. As above, the focusing optics 338 can be part of the end cap 334, such as a positive GRIN lens.

Figure 29:
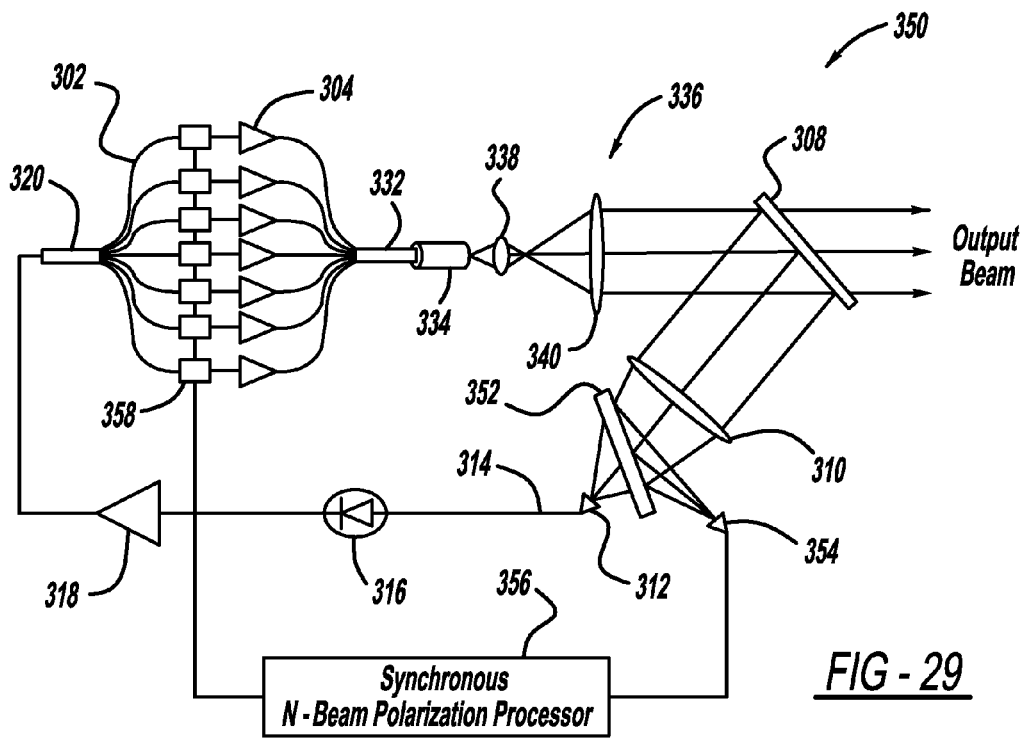
FIG. 29 is a schematic plan view of a fiber laser amplifier including a tapered fiber bundle, a feedback single mode fiber, a pre-amplifier and fiber polarization controllers.

It is possible that the systems 300 and 330 are passively self-polarizing, meaning that all the fiber beams have the same polarization state, which is required for coherent beam combination. This can be done passively using the single mode fiber 314, or the polarization of the fiber amplifiers 302 can be forced to all have the same polarization by including polarization maintaining fibers. Alternately, polarization controllers can be provided in the system to maintain the polarization orientation in the fiber amplifiers 302 in the manner as discussed above. FIG. 29 is a schematic plan view of a fiber laser amplifier system 350 that provides polarization control, where like elements to the systems 300 and 330 are identified by the same reference numeral. In this embodiment, a polarizer 352 is provided between the coupling lens 310 and the collector 312 that directs a portion of the beam to a polarization detector 354 that measures the polarization difference in the coupled beams from the output beam of the tapered fiber bundle 332. A synchronous N-beam polarization processor 356 receives the measured polarization signal from the polarization detector 354 and controls polarization controllers 358 in each fiber amplifier 302 so that the polarization orientation in each fiber amplifier 302 is maintained. In order for the polarization processor 356 to identify which of the N beams requires correction, each of the polarization controllers 358 must provide a unique dither frequency or code, similar to the method described for phase control in previous embodiments.

Figure 30:
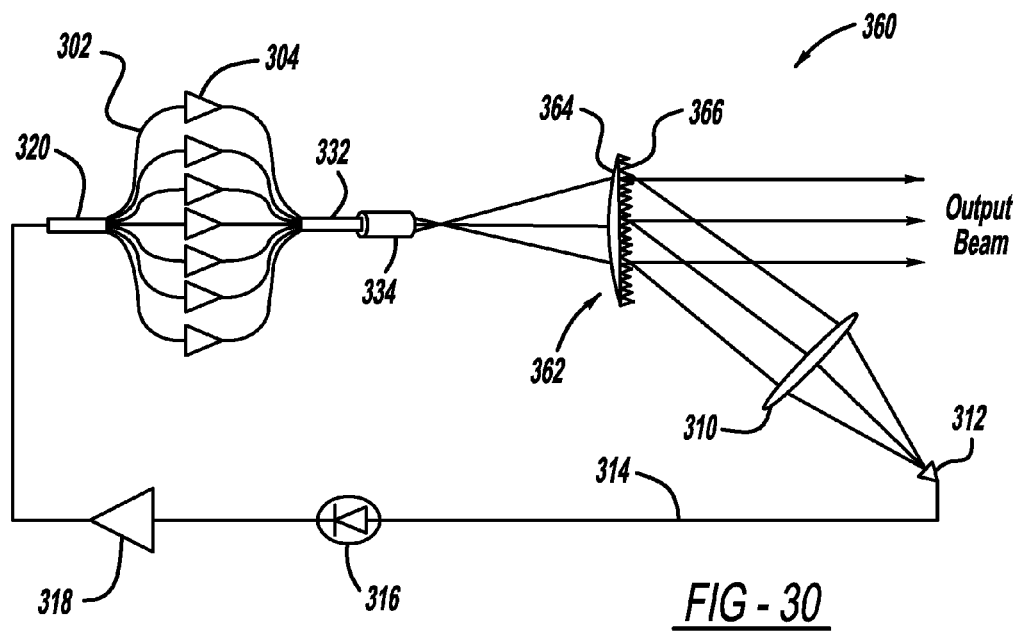
FIG. 30 is a schematic plan view of a fiber laser amplifier including a tapered fiber bundle, a feedback single mode fiber, a pre-amplifier and a sampling grating.

FIG. 30 is a schematic plan view of a fiber laser amplifier system 360 similar to the systems 300, 330 and 350, where like elements are identified by the same reference numeral. In this embodiment, the collimating and magnifying telescope includes a combined lens and sampling grating assembly 362 including lens 364 and a sampling grating 366. The lens 364 collimates the output beam from the end cap 334 and the sampling grating 366 redirects a small portion of the output beam onto the coupling lens 310. The sampling grating 366 can provide an arbitrary small sample of the output without the introduction of an additional separate optic. The magnifying telescope could also employ mirrors instead of lenses.

The foregoing discussion discloses and describes merely exemplary embodiments. One skilled in the art will readily recognize from such discussion, and from the accompanying drawings and claims, that various changes, modifications and variations can be made therein without departing from the spirit and scope of the invention as defined in the following claims.

What is claimed is:

1. A fiber amplifier system comprising:
  a plurality of fiber amplifiers each receiving and amplifying a fiber beam, said fiber amplifiers each including an output end; and
  a tapered fiber bundle including an input end and an output end, said input end being coupled to the output end of all of the fiber amplifiers, said output end of the tapered fiber bundle being a combined fiber including a portion of all of the fiber amplifiers in a single fiber mass, said tapered fiber bundle outputting a combined output beam, wherein the tapered fiber bundle is formed and configured so that individual fiber modes propagating in each fiber amplifier coherently combine in the tapered fiber bundle into a single combined fiber mode in the combined output beam.

2. The system according to claim 1 further comprising a polarization detector, a synchronous polarization processor and a plurality of polarization controllers each receiving one of the fiber beams, said polarization detector detecting the polarization of the fiber beams and providing polarization measurement error signals to the polarization processor, said polarization processor controlling the polarization controllers to control the polarization of the fiber beams in the fiber amplifiers in response to the polarization measurement error signals to make the orientation of the polarization of the fiber beams the same.

3. The system according to claim 2 wherein the polarization detector detects the polarization of the fiber beams by detecting a unique dither on the fiber beams in phase or amplitude using distinct frequencies for frequency modulation or amplitude modulation or a distinct code for code division multiple access or time division multiple access.

4. The system according to claim 1 wherein the fiber amplifiers are coupled together into a multi-core fiber where each fiber in the multi-core fiber includes an air cladding layer, said multi-core fiber being chemically etched at one end to separate constituent fibers, and wherein the individual fiber amplifiers are coupled to the multi-core fiber by splices to said constituent fibers, and the other end of said multi-core fiber is tapered to form the tapered fiber bundle.

5. The system according to claim 1 further comprising an end cap optically coupled to the output end of the tapered fiber bundle, said end cap expanding the output beam from the tapered fiber bundle.

6. The system according to claim 5 wherein the end cap includes a negative gradient index lens and a uniform glass rod optically coupled together where the negative gradient index lens is coupled to the output end of the tapered fiber bundle.

7. The system according to claim 5 wherein the end cap includes a positive gradient index lens coupled to an output end of the end cap or a positive lens formed by a curved surface at an output end of the end cap.

8. The system according to claim 7 wherein the positive lens is part of a collimating and magnifying telescope.

9. The system according to claim 5 wherein the end cap includes an anti-reflective coating provided on an output end of the end cap.

10. The system according to claim 1 further comprising a collimating and magnifying telescope receiving the output beam from the tapered fiber bundle, said collimating and magnifying telescope expanding and collimating the output beam.

11. The system according to claim 1 further comprising a pre-amplifier, said pre-amplifier receiving the feedback beam from the single mode fiber and amplifying the feedback beam before it is sent to the splitter.

12. The system according to claim 1 wherein the tapered fiber bundle includes a plurality of coreless cladding fibers positioned around the fiber amplifiers.

13. The system according to claim 1 wherein the tapered fiber bundle includes a low index of refraction glass tube provided around the fiber amplifiers.

14. A fiber amplifier system comprising:
a splitter splitting a feedback beam into a plurality of fiber beams;
a plurality of fiber amplifiers each receiving and amplifying a fiber beam, said fiber amplifiers each including an output end;
a tapered fiber bundle including an input end and an output end, said input end being coupled to the output end of all of the fiber amplifiers, said output end of the tapered fiber bundle being a combined fiber including a portion of all of the fiber amplifiers in a single fiber mass, said tapered fiber bundle outputting a combined output beam;
an end cap optically coupled to the output end of the tapered fiber bundle, said end cap expanding the output beam from the tapered fiber bundle;
a combined lens and sampling grating assembly including a lens and a sampling grating, said sampling grating providing a sample beam from the output beam from the end cap, said lens collimating the output beam from the end cap;
a single mode fiber receiving the sample beam from the sampling grating, said single mode fiber providing the feedback beam; and
a pre-amplifier receiving the feedback beam from the single mode fiber and amplifying the feedback beam before it is sent to the splitter.

15. The system according to claim 14 further comprising a collimating and magnifying telescope receiving the output beam from the tapered fiber bundle before the beam sampler, said collimating and magnifying telescope expanding and collimating the output beam.

16. The system according to claim 14 wherein the beam sampler is part of a combined lens and sampling grating assembly including a lens and a sampling grating, said lens collimating the output beam from the tapered fiber bundle.

17. The system according to claim 14 wherein the fiber amplifiers are coupled together into a multi-core fiber where each fiber in the multi-core fiber includes an air cladding layer, said multi-core fiber being chemically etched at one end to separate constituent fibers, and wherein the individual fiber amplifiers are coupled to the multi-core fiber by splices to said constituent fibers, and the other end of said multi-core fiber is tapered to form the tapered fiber bundle.

18. The system according to claim 14 wherein the tapered fiber bundle includes a plurality of coreless cladding fibers positioned around the fiber amplifiers.

19. The system according to claim 14 wherein the tapered fiber bundle includes a low index of refraction glass tube provided around the fiber amplifiers.

* * * * *